(12) United States Patent
Kim et al.

(10) Patent No.: US 11,575,943 B2
(45) Date of Patent: Feb. 7, 2023

(54) VIDEO SIGNAL PROCESSING METHOD AND DEVICE THEREFOR

(71) Applicant: WILUS INSTITUTE OF STANDARDS AND TECHNOLOGY INC., Seongnam-si (KR)

(72) Inventors: Dongcheol Kim, Suwon-Si Gyeonggi-do (KR); Jaehong Jung, Seoul (KR); Geonjung Ko, Seoul (KR); Juhyung Son, Uiwang-Si Gyeonggi-do (KR); Jinsam Kwak, Uiwang-si Gyeonggi-do (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

(21) Appl. No.: 17/844,330

(22) Filed: Jun. 20, 2022

(65) Prior Publication Data

US 2022/0321922 A1    Oct. 6, 2022

Related U.S. Application Data

(63) Continuation of application No. PCT/KR2020/018793, filed on Dec. 21, 2020.

(30) Foreign Application Priority Data

Dec. 20, 2019 (KR) .......................... 10-2019-0171788
Apr. 4, 2020 (KR) .......................... 10-2020-0041255
Apr. 24, 2020 (KR) .......................... 10-2020-0050377

(51) Int. Cl.
*H04N 19/70* (2014.01)
*H04N 19/172* (2014.01)
*H04N 19/82* (2014.01)

(52) U.S. Cl.
CPC ........... *H04N 19/70* (2014.11); *H04N 19/172* (2014.11); *H04N 19/82* (2014.11)

(58) Field of Classification Search
None
See application file for complete search history.

(56) References Cited

U.S. PATENT DOCUMENTS 11,146,824 B2    10/2021   Hsiang et al.
2013/0077680 A1   3/2013   Wang et al.
(Continued)

FOREIGN PATENT DOCUMENTS

KR   10-2015-0051222 A    5/2015
KR   10-2015-0140777 A   12/2015
(Continued)

OTHER PUBLICATIONS

International Search Report of International application No. PCT/KR2020/018793, dated Apr. 21, 2021.
(Continued)

*Primary Examiner* — Christopher Braniff

(57) ABSTRACT

A video signal decoding device comprises a processor, wherein: the processor decodes a sequence parameter set (SPS) raw byte sequence payload (RBSP) syntax included in a bitstream of a video signal, and decodes the bitstream on the basis of the decoding result of the SPS RBSP syntax; the SPS RBSP syntax includes a first syntax element related to the number of one or more sub-pictures configuring one picture, and a second syntax element indicating whether to process a boundary of the one or more sub-pictures as a boundary of the one picture on the basis of the first syntax element; and the second syntax element is parsed only when the number of the one or more sub-pictures is two or more.

21 Claims, 30 Drawing Sheets

(56) References Cited

U.S. PATENT DOCUMENTS

2016/0173887 A1* 6/2016 Deshpande .......... H04N 19/124
                                                    375/240.08
2019/0342562 A1   11/2019 Hannuksela

FOREIGN PATENT DOCUMENTS

| KR | 10-2016-0016853 A | 2/2016 |
|----|-------------------|--------|
| WO | 2021134055 A1 | 7/2021 |
| WO | 2021137295 A1 | 7/2021 |
| WO | 2021159962 A1 | 8/2021 |
| WO | 2021188357 A1 | 9/2021 |
| WO | 2021204135 A1 | 10/2021 |
| WO | 2021216736 A1 | 10/2021 |

OTHER PUBLICATIONS

Written Opinion of International application No. PPCT/KR2020/018793, dated Apr. 21, 2021.
"Examination report under sections 12 & 13 of the Patents Act, 1970 and the Patents Rules, 2003" for Application No. 202227036785 from Intellectual Property India, dated Dec. 6, 2022.

* cited by examiner

 REFERENCE SAMPLE
 SAMPLE OF CURRENT UNIT
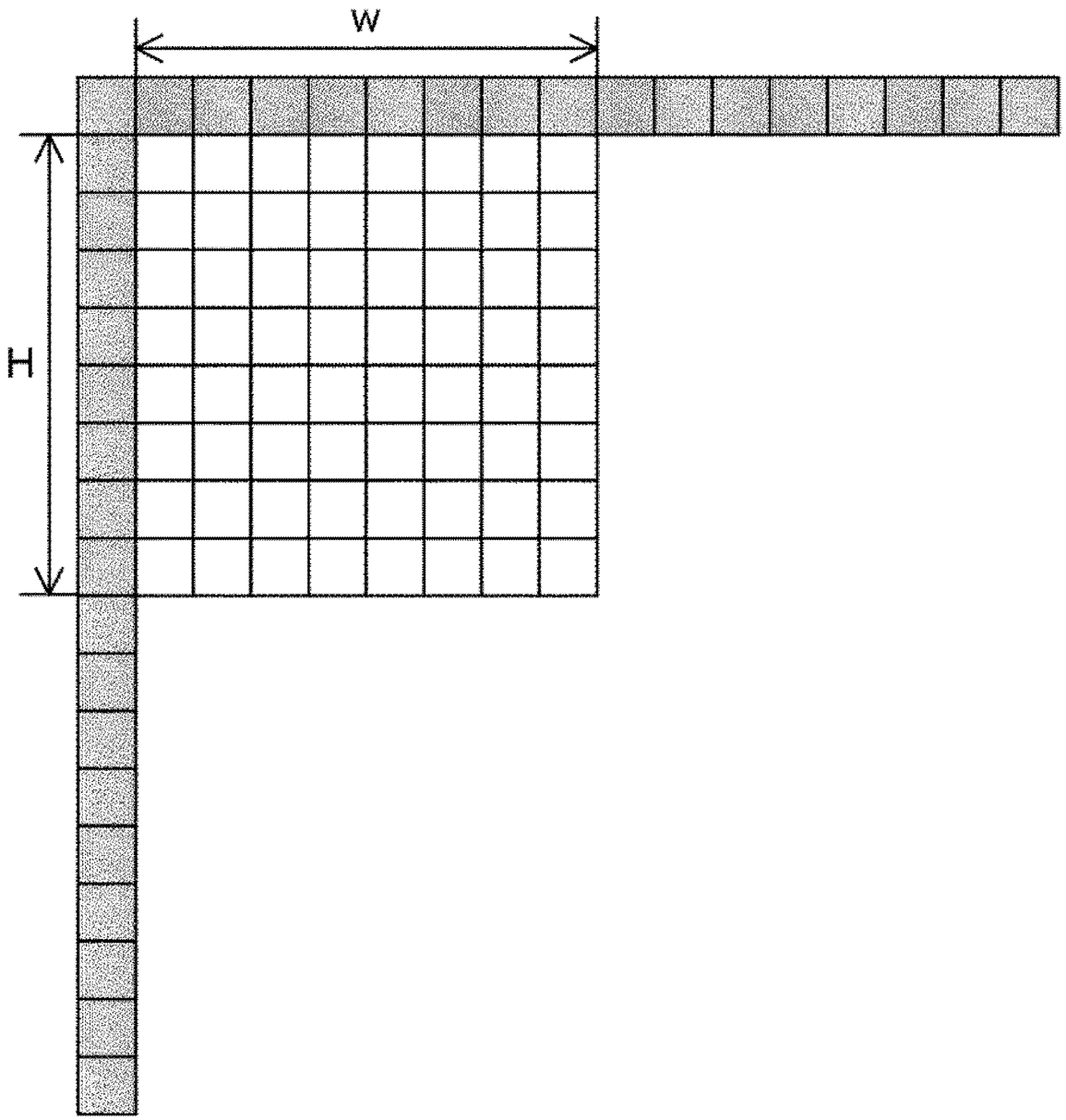
*Fig. 5*

| nal_unit_type | Name of nal_unit_type | Content of NAL unit and RBSP syntax structure | NAL unit type class |
|---|---|---|---|
| 0 | TRAIL_NUT | Coded slice of a trailing picture<br>slice_layer_rbsp( ) | VCL |
| 1 | STSA_NUT | Coded slice of an STSA picture<br>slice_layer_rbsp( ) | VCL |
| 2 | RADL_NUT | Coded slice of a RADL picture<br>slice_layer_rbsp( ) | VCL |
| 3 | RASL_NUT | Coded slice of a RASL picture<br>slice_layer_rbsp( ) | VCL |
| 4..6 | RSV_VCL_4..<br>RSV_VCL_6 | Reserved non-IRAP VCL NAL unit types | VCL |
| 7<br>8 | IDR_W_RADL<br>IDR_N_LP | Coded slice of an IDR picture<br>slice_layer_rbsp( ) | VCL |
| 9 | CRA_NUT | Coded slice of a CRA picture<br>silce_layer_rbsp( ) | VCL |
| 10 | GDR_NUT | Coded slice of a GDR picture<br>slice_layer_rbsp( ) | VCL |
| 11<br>12 | RSV_IRAP_11<br>RSV_IRAP_12 | Reserved IRAP VCL NAL unit types | VCL |
| 13 | DPS_NUT | Decoding parameter set<br>decoding_parameter_set_rbsp( ) | non-VCL |
| 14 | VPS_NUT | Video parameter set<br>video_parameter_set_rbsp( ) | non-VCL |
| 15 | SPS_NUT | Sequence parameter set<br>seq_parameter_set_rbsp( ) | non-VCL |
| 16 | PPS_NUT | Picture parameter set<br>pic_parameter_set_rbsp( ) | non-VCL |
| 17<br>18 | PREFIX_APS_NUT<br>SUFFIX_APS_NUT | Adaptation parameter set<br>adaptation_parameter_set_rbsp( ) | non-VCL |
| 19 | PH_NUT | Picture header<br>picture_header_rbsp( ) | non-VCL |
| 20 | AUD_NUT | AU delimiter<br>access_unit_delimiter_rbsp( ) | non-VCL |
| 21 | EOS_NUT | End of sequence<br>end_of_seq_rbsp( ) | non-VCL |
| 22 | EOB_NUT | End of bitstream<br>end_of_bitstream_rbsp( ) | non-VCL |
| 23<br>24 | PREFIX_SEI_NUT<br>SUFFIX_SEI_NUT | Supplemental enhancement information<br>sei_rbsp( ) | non-VCL |
| 25 | FD_NUT | Filler data<br>filler_data_rbsp( ) | non-VCL |
| 26<br>27 | RSV_NVCL_26<br>RSV_NVCL_27 | Reserved non-VCL NAL unit types | non-VCL |
| 28..31 | UNSPEC_28..<br>UNSPEC_31 | Unspecified non-VCL NAL unit types | non-VCL |

*Fig. 8*

| seq_parameter_set_rbsp( ) { | Descriptor |
|---|---|
| sps_decoding_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| sps_seq_parameter_set_id | u(4) |
| chroma_format_idc | u(2) |
| if( chroma_format_idc == 3 ) | |
| separate_colour_plane_flag | u(1) |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if( subpics_present_flag ) { | |
| sps_num_subpics_minus1 | u(8) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |
| subpic_height_minus1[ i ] | u(v) |
| subpic_treated_as_pic_flag[ i ] | u(1) |
| loop_filter_across_subpic_enabled_flag[ i ] | u(1) |
| } | |
| } | |
| sps_subpic_id_present_flag | u(1) |
| if( sps_subpics_id_present_flag ) { | |
| sps_subpic_id_signalling_present_flag | u(1) |
| if( sps_subpics_id_signalling_present_flag ) { | |
| sps_subpic_id_len_minus1 | ue(v) |
| for( i = 0; i <= sps_num_subpics_minus1; i++ ) | |
| sps_subpic_id[ i ] | u(v) |
| } | |
| } | |
| bit_depth_minus8 | ue(v) |
| ... | |

*Fig. 11*

| pic_parameter_set_rbsp( ) { | Descriptor |
|---|---|
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   ... | |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   ... | |

*Fig. 12*

| picture_header_rbsp( ) { | Descriptor |
|---|---|
| ... | |
|   ph_pic_parameter_set_id | ue(v) |
| ... | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
| ... | |

*Fig. 13*

| picture_header_rbsp( ) { | Descriptor |
|---|---|
| ... | |
|   if( sps_subpic_id_present_flag && !sps_subpic_id_signalling_flag ) { | |
|     ph_subpic_id_len_minus1 | ue(v) |
|     for( i = 0; i <= sps_num_subpics_minus1; i++ ) | |
|       ph_subpic_id[ i ] | u(v) |
|   } | |
| ... | |

Fig. 14

| picture_header_rbsp( ) { | Descriptor |
|---|---|
| ... | |
|   if( sps_subpic_id_present_flag && !sps_subpic_id_signalling_flag && !pps_subpic_id_signalling_flag ) { | |
|     ph_subpic_id_len_minus1 | ue(v) |
|     for( i = 0; i <= sps_num_subpics_minus1; i++ ) | |
|       ph_subpic_id[ i ] | u(v) |
|   } | |
| ... | |

Fig. 15

| pic_parameter_set_rbsp( ) { | Descriptor |
|---|---|
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | | pps_subpic_id_signalling_present_flag equal to 1 specifies that subpicture ID mapping is signalled in the PPS. pps_subpic_id_signalling_present_flag equal to 0 specifies that subpicture ID mapping is not signalled in the PPS. When sps_subpic_id_present_flag is 0 or sps_subpic_id_signalling_present_flag is equal to 1, pps_subpic_id_signalling_present_flag shall be equal to 0. When sps_subpic_id_present_flag is equal to 1 and sps_subpic_id_signalling_present_flag is equal to 0, pps_subpic_id_signalling_present_flag shall be equal to 1.

*Fig. 16*

```
for( i = 0; i <= sps_num_subpics_minus1; i++ )
   SubpicIdList[ i ] = sps_subpic_id_present_flag ?
     ( sps_subpic_id_signalling_present_flag ?  sps_subpic_id[ i ] :
       ( ph_subpic_id_signalling_present_flag ?  ph_subpic_id[ i ] :
   ( pps_subpic_id_signalling_present_flag ? pps_subpic_id[ i ] : i ) ) ) : i
```

*Fig. 17*

| seq_parameter_set_rbsp( ) { | Descriptor |
|---|---|
| ... | |
| if( subpics_present_flag ) { | |
| sps_num_subpics_minus1 | u(8) |
| sps_subpic_id_present_flag | u(1) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |
| subpic_height_minus1[ i ] | u(v) |
| subpic_treated_as_pic_flag[ i ] | u(1) |
| loop_filter_across_subpic_enabled_flag[ i ] | u(1) |
| } | |
| } | |
| ... | |

*Fig. 18*

| seq_parameter_set_rbsp( ) { | Descriptor |
|---|---|
| ... | |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| ... | |

Fig. 19

| seq_parameter_set_rbsp( ) { | Descriptor |
|---|---|
| ... | |
| log2_min_luma_coding_block_size_minus2 | ue(v) |
| If(MinCbSizeY !=CtbSizeY){ | |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma} | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag && MinCbSizeY !=CtbSizeY ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| ... | |

*Fig. 20*

| picture_header_rbsp( ) { | Descriptor |
|---|---|
| ... | |
| if( partition_constraints_override_enabled_flag ) { | |
|   partition_constraints_override_flag | u(1) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| ... | |

*Fig. 21*

| picture_header_rbsp( ) { | Descriptor |
|---|---|
| ... | |
|   if( cu_qp_delta_enabled_flag ) { | |
|     pic_cu_qp_delta_subdiv_intra_slice | ue(v) |
|     pic_cu_qp_delta_subdiv_inter_slice | ue(v) |
|   } | |
|   if( pps_cu_chroma_qp_offset_list_enabled_flag ) { | |
|     pic_cu_chroma_qp_offset_subdiv_intra_slice | ue(v) |
|     pic_cu_chroma_qp_offset_subdiv_inter_slice | ue(v) |
|   } | |
| ... | |

Fig. 22

| picture_header_rbsp( ) { | Descriptor |
|---|---|
| ... | |
|   if( cu_qp_delta_enabled_flag && (CtbSizeY != MinCbSizeY)) { | |
|     pic_cu_qp_delta_subdiv_intra_slice | ue(v) |
|     pic_cu_qp_delta_subdiv_inter_slice | ue(v) |
|   } | |
|   if( pps_cu_chroma_qp_offset_list_enabled_flag && (CtbSizeY != MinCbSizeY)) { | |
|     pic_cu_chroma_qp_offset_subdiv_intra_slice | ue(v) |
|     pic_cu_chroma_qp_offset_subdiv_inter_slice | ue(v) |
|   } | |
| ... | |

Fig. 23

| seq_parameter_set_rbsp( ) { | Descriptor |
|---|---|
|   sps_seq_parameter_set_id | u(4) |
|   sps_video_parameter_set_id | u(4) |
|   ... | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|       subpic_ctu_top_left_x[ i ] | u(v) |
|       if( i > 0 && pic_height_max_in_luma_samples > CtbSizeY ) { | |
|       subpic_ctu_top_left_y[ i ] | u(v) |
|       if( i < sps_num_subpics_minus1 && pic_width_max_in_luma_samples > CtbSizeY ) | |
|       subpic_width_minus1[ i ] | u(v) |
|       if( i < sps_num_subpics_minus1 && pic_height_max_in_luma_samples > CtbSizeY ) | |
|       subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |
|         sps_subpic_id[ i ] | u(v) |
|     } | |
|   } | |
|   bit_depth_minus8 | ue(v) |

*Fig. 24*

| seq_parameter_set_rbsp( ) { | Descriptor |
|---|---|
| if( subpic_info_present_flag ) { | |
| sps_num_subpics_minus1 | ue(v) |
| If(sps_num_subpics_minus1>0) | |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| If(sps_num_subpics_minus1>0){ | |
| sps_subpic_id_len_minus1 | ue(v) |
| subpic_id_mapping_explicitly_signalled_flag | u(1) |
| } | |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |

*Fig. 25*

| pic_parameter_set_rbsp( ) { | Descriptor |
|---|---|
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |

*Fig. 26* subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1 or sps_num_subpics_minus1 is equal to 0, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

*Fig. 27*

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| ... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| ... | |
| if(NumTilesInPic > 1) | |
| loop_filter_across_tiles_enabled_flag | u(1) |
| loop_filter_across_slices_enabled_flag | u(1) |
| } | |
| ... | |

*Fig. 28*

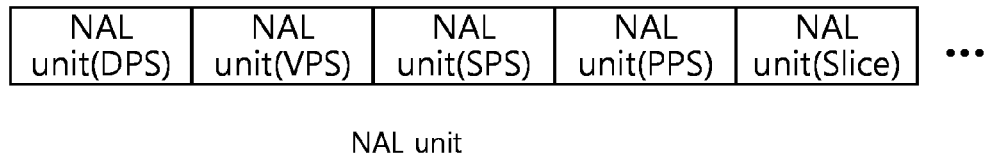

NAL unit

*Fig. 29*

Decoding parameter set RBSP syntax

| decoding_parameter_set_rbsp( ) { | Descriptor |
|---|---|
| dps_decoding_parameter_set_id | u(4) |
| dps_max_sub_layers_minus1 | u(3) |
| dps_reserved_zero_bit | u(1) |
| profile_tier_level( dps_max_sub_layers_minus1 ) | |
| dps_extension_flag | u(1) |
| if( dps_extension_flag ) | |
| while( more_rbsp_data( ) ) | |
| dps_extension_data_flag | u(1) |
| rbsp_trailing_bits( ) | |
| } | |

*Fig. 30A*

Sequence parameter set RBSP syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc == 3 ) | |
| separate_colour_plane_flag | u(1) |
| pic_width_max_in_luma_samples | ue(v) |
| pic_height_max_in_luma_samples | ue(v) |
| subpics_present_flag | u(1) |

*Fig. 30B* profile tier level syntax

| profile_tier_level( maxNumSubLayersMinus1 ) { | Descriptor |
|---|---|
| general_profile_idc | u(7) |
| general_tier_flag | u(1) |
| num_sub_profiles | u(8) |
| for( i = 0; i <= num_sub_profiles; i++ ) | |
| general_sub_profile_idc[ i ] | u(32) |
| general_constraint_info( ) | |
| general_level_idc | u(8) |
| for( i = 0; i < maxNumSubLayersMinus1; i++ ) | |
| sub_layer_level_present_flag[ i ] | u(1) |
| while( !byte_aligned( ) ) | |
| ptl_alignment_zero_bit | f(1) |

*Fig. 30C*

Video parameter set syntax

```
video_parameter_set_rbsp( ) {
    vps_video_parameter_set_id
    vps_max_layers_minus1
    if( vps_max_layers_minus1 > 0 )
        vps_all_independent_layers_flag
    for( i = 0; i <= vps_max_layers_minus1; i++ ) {
        vps_layer_id[ i ]
        if( i > 0 && !vps_all_independent_layers_flag ) {
            vps_independent_layer_flag[ i ]
            if( !vps_independent_layer_flag[ i ] )
                for( j = 0; j < i; j++ )
                    vps_direct_dependency_flag[ i ][ j ]
        }
    }
    if( vps_max_layers_minus1 > 0 ) {
        vps_output_layers_mode
        if( vps_output_layers_mode == 2 )
            for( i = 0; i < vps_max_layers_minus1; i++ )
                vps_output_layer_flag[ i ]
    } vps_constraint_info_present_flag
    vps_reserved_zero_7bits
    if( vps_constraint_info_present_flag )
        general_constraint_info( )
    vps_extension_flag
    if( vps_extension_flag )
        while( more_rbsp_data( ) )
            vps_extension_data_flag
    rbsp_trailing_bits( )
}
```

*Fig. 31A*

General constraint information syntax

| general_constraint_info( ) { | Descriptor |
|---|---|
| general_progressive_source_flag | u(1) |
| general_interlaced_source_flag | u(1) |
| general_non_packed_constraint_flag | u(1) |
| general_frame_only_constraint_flag | u(1) |
| intra_only_constraint_flag | u(1) |
| max_bitdepth_constraint_idc | u(4) |
| max_chroma_format_constraint_idc | u(2) |
| frame_only_constraint_flag | u(1) |
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_joint_cbcr_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_affine_motion_constraint_flag | u(1) |
| no_bcw_constraint_flag | u(1) |
| no_ibc_constraint_flag | u(1) |
| no_ciip_constraint_flag | u(1) |
| no_fpel_mmvd_constraint_flag | u(1) |
| no_triangle_constraint_flag | u(1) |
| no_ladf_constraint_flag | u(1) |
| no_transform_skip_constraint_flag | u(1) |
| no_bdpcm_constraint_flag | u(1) |
| no_qp_delta_constraint_flag | u(1) |
| no_dep_quant_constraint_flag | u(1) |
| no_sign_data_hiding_constraint_flag | u(1) |
| ADD reserved bits for future extensions | |
| while( !byte_aligned( ) ) | |
|   gci_alignment_zero_bit | f(1) |
| } | |

*Fig. 31B*

Sequence parameter set RBSP syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc == 3 ) | |
| separate_colour_plane_flag | u(1) |
| pic_width_max_in_luma_samples | ue(v) |
| pic_height_max_in_luma_samples | ue(v) |
| subpics_present_flag | u(1) |
| if( subpics_present_flag ) { | |
| max_grid_idxs_minus1 | u(8) |
| subpic_grid_col_width_minus1 | u(v) |
| subpic_grid_row_height_minus1 | u(v) |
| for( i = 0; i < NumSubPicGridRows; i++ ) | |
| for( j = 0; j < NumSubPicGridCols; j++ ) | |
| subpic_grid_idx[ i ][ j ] | u(v) |
| for( i = 0; i <= NumSubPics; i++ ) { | |
| subpic_treated_as_pic_flag[ i ] | u(1) |
| loop_filter_across_subpic_enabled_flag[ i ] | u(1) |
| } | |
| } | |
| bit_depth_luma_minus8 | ue(v) |
| bit_depth_chroma_minus8 | ue(v) |
| min_qp_prime_ts_minus4 | ue(v) |
| log2_max_pic_order_cnt_lsb_minus4 | ue(v) |
| if( sps_max_sub_layers_minus1 > 0 ) | |
| sps_sub_layer_ordering_info_present_flag | u(1) |
| for( i = ( sps_sub_layer_ordering_info_present_flag ? 0 : sps_max_sub_layers_minus1 ); i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| } | |
| if( ChromaArrayType != 0 ) | |
| qtbtt_dual_tree_intra_flag | u(1) |
| log2_ctu_size_minus5 | u(2) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slices != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if ( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| sps_weighted_pred_flag | u(1) |
| sps_weighted_bipred_flag | u(1) |
| sps_sao_enabled_flag | u(1) |
| sps_alf_enabled_flag | u(1) |

*Fig. 32*

Sequence parameter set RBSP syntax

| | |
|---|---|
| sps_transform_skip_enabled_flag | u(1) |
| if( sps_transform_skip_enabled_flag ) { | |
| sps_bdpcm_enabled_flag | u(1) |
| sps_joint_cbcr_enabled_flag | u(1) |
| if( ( CtbSizeY / MinCbSizeY - 1 ) <= ( pic_width_in_luma_samples / MinCbSizeY - 1 ) ) { | |
| sps_ref_wraparound_enabled_flag | u(1) |
| if( sps_ref_wraparound_enabled_flag ) | |
| sps_ref_wraparound_offset_minus1 | ue(v) |
| } | |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| sps_smvd_enabled_flag | u(1) |
| sps_dmvr_enabled_flag | u(1) |
| if( sps_bdof_enabled_flag || sps_dmvr_enabled_flag ) | |
| sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( sps_cclm_enabled_flag && chroma_format_idc == 1 ) [Ed. (JC): should sps_cclm_colocated_chroma_flag also be signalled for 422 case since it's used in the decoding process, to be confirmed] | |
| sps_cclm_colocated_chroma_flag | u(1) |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| sps_sbt_enabled_flag | u(1) |
| if( sps_sbt_enabled_flag ) | |
| sps_sbt_max_size_64_flag | u(1) |
| sps_affine_enabled_flag | u(1) |
| if( sps_affine_enabled_flag ) { | |
| sps_affine_type_flag | u(1) |
| sps_affine_amvr_enabled_flag | u(1) |
| sps_affine_prof_enabled_flag | u(1) |
| } | |
| if( chroma_format_idc == 3 ) | |
| sps_palette_enabled_flag | u(1) |
| sps_bcw_enabled_flag | u(1) |
| sps_ibc_enabled_flag | u(1) |
| sps_ciip_enabled_flag | u(1) |
| if( sps_mmvd_enabled_flag ) | |
| sps_fpel_mmvd_enabled_flag | u(1) |
| sps_triangle_enabled_flag | u(1) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |

Fig. 33

Sequence parameter set RBSP syntax

| | |
|---|---|
| sps_scaling_list_enabled_flag | u(1) |
| hrd_parameters_present_flag | u(1) |
| if( general_hrd_parameters_present_flag ) { | |
|   num_units_in_tick | u(32) |
|   time_scale | u(32) |
|   sub_layer_cpb_parameters_present_flag | u(1) |
|   if( sub_layer_cpb_parameters_present_flag ) | |
|     general_hrd_parameters( 0, sps_max_sub_layers_minus1 ) | |
|   else | |
|     general_hrd_parameters( sps_max_sub_layers_minus1, sps_max_sub_layers_minus1 ) | |
| } | |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

*Fig. 34*

| seq_parameter_set_rbsp( ) { | Descriptor |
|---|---|
| sps_seq_parameter_set_id | u(4) |
| sps_entropy_coding_sync_enabled_flag | u(1) |
| ... | |
| sps_weighted_pred_flag | u(1) |
| sps_weighted_bipred_flag | u(1) |
| ... | |
| same_qp_table_for_chroma | u(1) |
| ... | |
| sps_explicit_mts_intra_enabled_flag | u(1) |
| sps_explicit_mts_inter_enabled_flag | u(1) |
| ... | |
| sps_affine_amvr_enabled_flag | u(1) |
| sps_affine_prof_enabled_flag | u(1) |
| ... | |
| sps_explicit_scaling_list_enabled_flag | u(1) |
| ... | |
| sps_sign_data_hiding_enabled_flag | u(1) |
| sps_virtual_boundaries_enabled_flag | u(1) |
| ... | |
| } | |

*Fig. 35*

| general_constraint_info( ) { | Descriptor |
|---|---|
| general_progressive_source_flag | u(1) |
| general_interlaced_source_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| ... | |
| no_weighted_pred_constraint_flag | u(1) |
| no_weighted_bipred_constraint_flag | u(1) |
| no_same_qp_table_for_chroma_constraint_flag | u(1) |
| no_explicit_mts_intra_onstraint_flag | u(1) |
| no_explicit_mts_inter_constraint_flag | u(1) |
| no_affine_amvr_constraint_flag | u(1) |
| no_affine_prof_constraint_flag | u(1) |
| no_explicit_scaling_list_constraint_flag | u(1) |
| no_virtual_boundaries_constraint_flag | u(1) |
| ... | |
| gci_alignment_zero_bit | f(1) |
| num_reserved_constraint_bytes | u(8) |
| for( i = 0; i < num_reserved_constraint_bytes; i++ ) | |
|   gci_reserved_constraint_byte[ i ] | u(8) |
| } | |

*Fig. 36*

VIDEO SIGNAL PROCESSING METHOD AND DEVICE THEREFOR

CROSS-REFERENCE TO RELATED APPLICATIONS

This application is a continuation of pending PCT International Application No. PCT/KR2020/018793, which was filed on Dec. 21, 2020, and which claims priority under 35 U.S.C. 119(a) to Korean Patent Application No. 10-2019-0171788 filed with the Korean Intellectual Property Office on Dec. 20, 2019, Korean Patent Application No. 10-2020-0041255 filed with the Korean Intellectual Property Office on Apr. 4, 2020, and Korean Patent Application No. 10-2020-0050377 filed with the Korean Intellectual Property Office on Apr. 24, 2020. The disclosures of the above patent applications are incorporated herein by reference in their entirety.

TECHNICAL FIELD

The present disclosure relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

The present disclosure is intended to provide a video signal processing method and a device for the same to increase video signal coding efficiency.

Technical Solution

The present disclosure provides a video signal processing method and a device for the same.

In detail, a video signal decoding device includes a processor, wherein the processor decodes a sequence parameter set (SPS) raw byte sequence payload (RBSP) syntax included in a bitstream of a video signal, and decodes the bitstream based on a decoding result of the SPS RBSP syntax, wherein the SPS RBSP syntax includes a first syntax element related to the number of at least one sub-picture constituting one picture, and includes a second syntax element indicating whether a boundary of the at least one sub-picture is processed like a boundary of the one picture based on the first syntax element, wherein the second syntax element is parsed only when the number of at least one sub-picture is at least 2.

Furthermore, in the present disclosure, a video signal encoding device includes a processor, wherein the processor obtains a sequence parameter set (SPS) raw byte sequence payload (RBSP) syntax, and encodes a bitstream including the SPS RBSP syntax, wherein the SPS RBSP syntax includes a first syntax element related to the number of at least one sub-picture constituting one picture, and includes a second syntax element indicating whether a boundary of the at least one sub-picture is processed like a boundary of the one picture based on the first syntax element, wherein the second syntax element is parsed only when the number of at least one sub-picture is at least 2.

Furthermore, in the present disclosure, a non-transitory computer-readable medium storing a bitstream of a video signal is provided, wherein the bitstream is encoded through an encoding method including: obtaining a sequence parameter set (SPS) raw byte sequence payload (RBSP) syntax; and encoding a bitstream including the SPS RBSP syntax, wherein the SPS RBSP syntax includes a first syntax element related to the number of at least one sub-picture constituting one picture, and includes a second syntax element indicating whether a boundary of the at least one sub-picture is processed like a boundary of the one picture based on the first syntax element, wherein the second syntax element is parsed only when the number of at least one sub-picture is at least 2.

Furthermore, in the present disclosure, the first syntax element indicates a value obtained by subtracting 1 from the number of at least one sub-picture.

Furthermore, in the present disclosure, the second syntax element further indicates whether loop filtering is applied to the boundary of the at least one sub-picture.

Furthermore, in the present disclosure, the value indicated by the first syntax element is larger than 0.

Furthermore, in the present disclosure, when the number of at least one sub-picture is 1, the second syntax element is inferred as a preset value indicating a specific operation.

Furthermore, in the present disclosure, the SPS RBSP syntax includes a third syntax element indicating whether information related to the at least one sub-picture is present, and includes a fourth syntax element indicating whether ID mapping for the at least one sub-picture is present, wherein the fourth syntax element is parsed when the third syntax element indicates presence of the information related to the at least one sub-picture, and when the fourth syntax element indicates presence of the ID mapping for the at least one sub-picture, an ID mapping value for the at least one sub-picture is signalled in the SPS RBSP syntax.

Furthermore, in the present disclosure, when the fourth syntax element indicates presence of the ID mapping for the at least one sub-picture and the ID mapping value for the at least one sub-picture is not signalled in the SPS RB SP syntax, the ID mapping value for the at least one sub-picture is signalled in a picture parameter set (PPS) RBSP syntax referring to the SPS RBSP syntax.

Advantageous Effects

The present disclosure provides a method for efficiently processing a video signal.

The effects obtainable from the present disclosure are not limited to the above effects, and other effects would be clearly understood by those of ordinary skill in the art from the following description.

BRIEF DESCRIPTION OF THE DRAWINGS

FIGS. 5 and 6 more specifically illustrate an intra prediction method according to an embodiment of the present invention.

FIG. 8 is a diagram illustrating a network abstract layer (NAL) unit type according to an embodiment of the present invention.

FIG. 11 is a diagram illustrating a sequence parameter set RBSP syntax structure according to an embodiment of the present invention.

FIG. 12 is a diagram illustrating a picture parameter set RBSP syntax structure according to an embodiment of the present invention.

FIG. 13 is a diagram illustrating a picture header RBSP syntax structure according to an embodiment of the present invention.

FIG. 14 is a diagram illustrating a picture header RBSP syntax structure according to an embodiment of the present invention.

FIG. 15 is a diagram illustrating a picture header RBSP syntax structure according to an embodiment of the present invention.

FIG. 16 illustrates a picture parameter set RBSP syntax structure and semantic according to an embodiment of the present invention.

FIG. 17 is a diagram illustrating a method of determining an array variable SubpicIdList[i] according to an embodiment of the present invention.

FIG. 18 is a diagram illustrating a sequence parameter set RBSP syntax structure according to an embodiment of the present invention.

FIG. 19 is a diagram illustrating a sequence parameter set RBSP syntax structure according to an embodiment of the present invention.

FIG. 20 is a diagram illustrating a sequence parameter set RBSP syntax structure according to an embodiment of the present invention.

FIG. 21 is a diagram illustrating a picture header RBSP syntax structure according to an embodiment of the present invention.

FIG. 22 is a diagram illustrating a picture header RBSP syntax structure according to an embodiment of the present invention.

FIG. 23 is a diagram illustrating a picture header RBSP syntax structure according to an embodiment of the present invention.

FIG. 24 is a diagram illustrating a sequence parameter set RBSP syntax structure according to an embodiment of the present invention.

FIG. 25 is a diagram illustrating a sequence parameter set RBSP syntax structure according to an embodiment of the present invention.

FIG. 26 is a diagram illustrating a picture parameter set RBSP syntax structure according to an embodiment of the present invention.

FIG. 27 is a diagram illustrating syntax element subpic_id_mapping_in_pps_flag included in a picture parameter set according to an embodiment of the present invention.

FIG. 28 is a diagram illustrating a picture parameter set RBSP syntax structure according to an embodiment of the present invention.

FIG. 29 is a diagram illustrating a network abstract layer (NAL) unit that is a basic unit constituting a bitstream according to an embodiment of the present invention.

FIGS. 30A to 30C are a diagram illustrating a decoding parameter set RBSP syntax structure, a sequence parameter set RBSP syntax structure, and a profile tier level syntax structure according to an embodiment of the present invention.

FIGS. 31A and 31B are a diagram illustrating a video parameter set RBSP syntax and a general constraint information syntax according to an embodiment of the present invention.

FIG. 32 is a diagram illustrating a sequence parameter set RBSP syntax according to an embodiment of the present invention.

FIG. 33 is a diagram illustrating a sequence parameter set RBSP syntax according to an embodiment of the present invention.

FIG. 34 is a diagram illustrating a sequence parameter set RBSP syntax according to an embodiment of the present invention.

FIG. 35 is a diagram illustrating a sequence parameter set RB SP syntax structure according to an embodiment of the present invention.

FIG. 36 is a diagram illustrating a general constraint information syntax structure according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including at least one a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
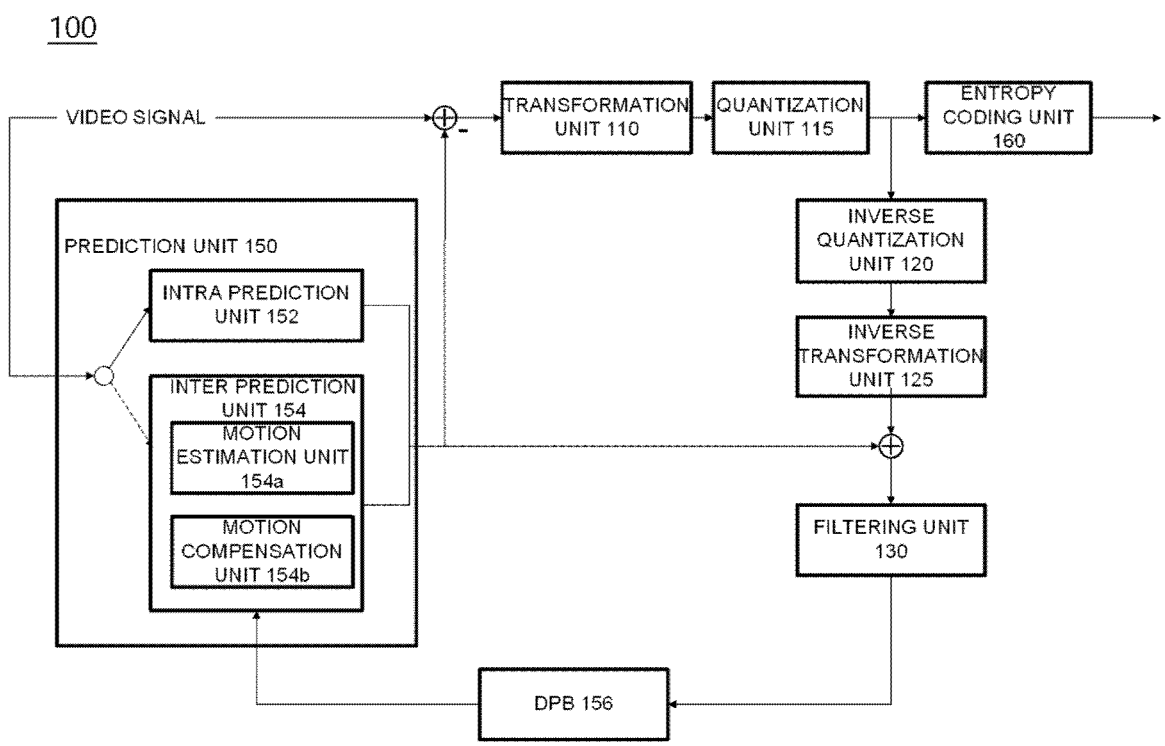
FIG. 1 is a schematic block diagram of a video signal encoding apparatus according to an embodiment of the present invention.

FIG. 1 is a schematic block diagram of a video signal encoding apparatus 100 according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to increase coding efficiency, instead of coding a picture signal as it is, a method for acquiring a reconstructed picture is used in which a picture is predicted using a region that has been already coded through the prediction unit 150, and a residual value between the original picture and the predicted picture is added to the predicted picture. An intra prediction unit 152 performs intra prediction within the current picture, and an inter prediction unit 154 predicts the current picture by using a reference picture stored in the decoded picture buffer 156. The intra prediction unit 152 performs intra prediction from reconstructed regions in the current picture, and transmits intra encoding information to an entropy coding unit 160. Again, the inter prediction unit 154 may include a motion estimation unit 154a and a motion compensation unit 154b. The motion estimation unit 154a obtains a motion vector value of the current region by referring to the reconstructed specific region. The motion estimation unit 154a may transmit position information (reference frame, motion vector, or the like) of the reference region to the entropy coding unit 160 to be included in the bitstream. The motion compensation unit 154b performs inter-motion compensation using the motion vector value transmitted from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The intra encoding information may include information on the reference sample. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

According to an additional embodiment, the prediction unit 150 may include an intra block copy (BC) prediction unit (not illustrated). The intra BC prediction unit performs intra BC prediction from reconstructed samples in the current picture, and transmits intra BC encoding information to an entropy coding unit 160. The intra BC prediction unit refers to a specific region in the current picture and obtains a block vector value indicating a reference region to be used for prediction of the current region. The intra BC prediction unit may perform intra BC prediction using the obtained block vector value. The intra BC prediction unit transmits the intra BC encoding information to the entropy coding unit 160. The intra BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients information, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used. For example, the entropy coding unit 160 may binarize information representing a quantized transform coefficient. In addition, the entropy coding unit 160 may generate a bitstream by arithmetic coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
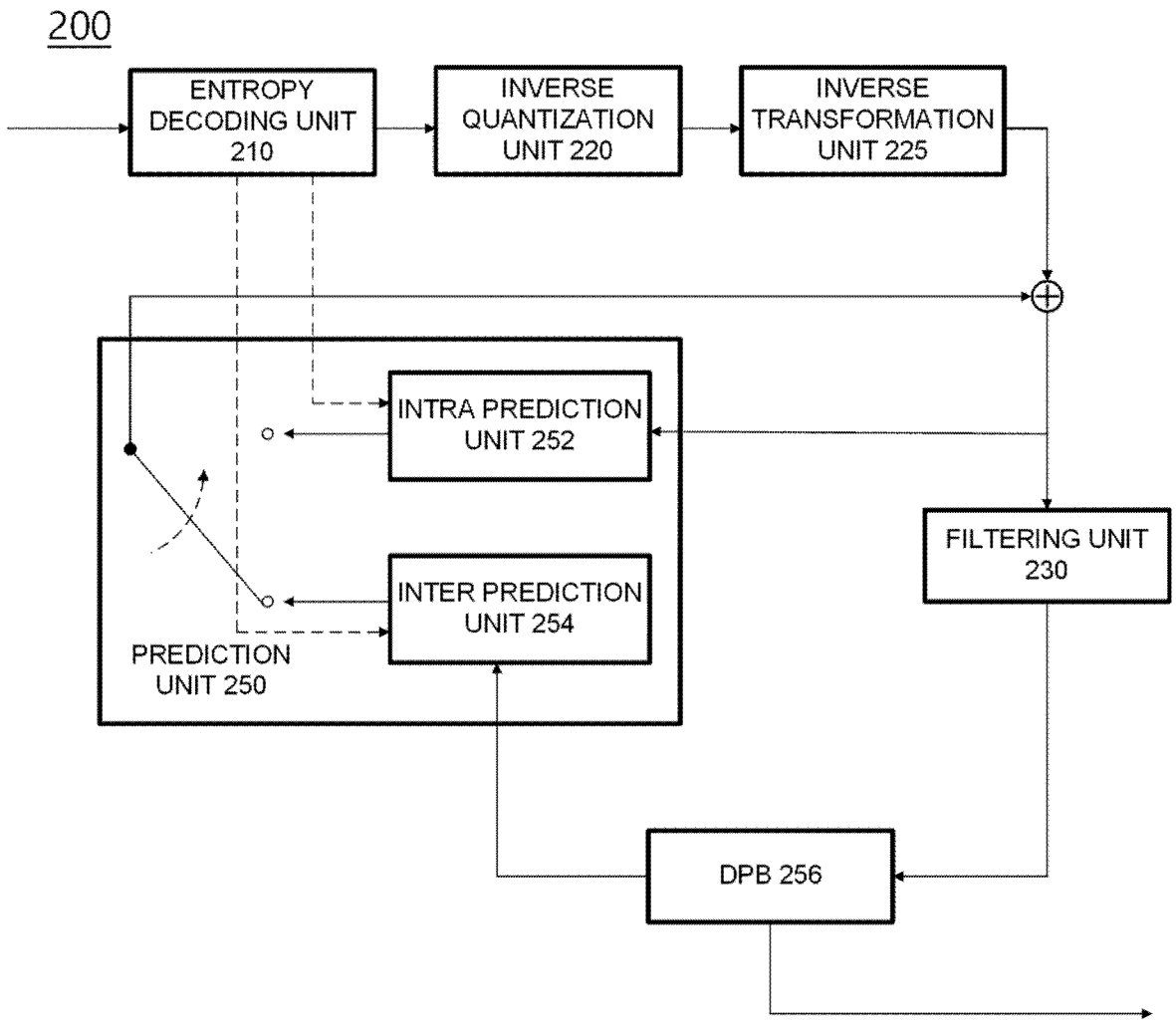
FIG. 2 is a schematic block diagram of a video signal decoding apparatus according to an embodiment of the present invention.

FIG. 2 is a schematic block diagram of a video signal decoding apparatus 200 according to an embodiment of the present disclosure. Referring to FIG. 2, the decoding apparatus 200 of the present disclosure includes an entropy decoding unit 210, a dequantization unit 220, an inverse transform unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binary code for transform coefficient information of a specific region from the video signal bitstream. Further, the entropy decoding unit 210 obtains a quantized transform coefficient by inverse-binarizing a binary code. The dequantization unit 220 dequantizes the quantized transform coefficient, the inverse transform unit 225 reconstructs a residual value by using the dequantized transform coefficient. The video signal processing device 200 reconstructs an original pixel value by summing the residual value obtained by the inverse transform unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. A picture (or tile/slice) using only the current picture for reconstruction, that is, performing intra prediction or intra BC prediction is referred to as an intra picture or I picture (or tile/slice), and a picture (or tile/slice) performing all of intra prediction, inter prediction, and intra BC prediction is referred to as an inter picture (or tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in a bi-prediction scheme may be regions selected from each of an L0 picture list and an L1 picture list.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not illustrated). The intra BC prediction unit may reconstruct the current region by referring to a specific region including reconstructed samples in the current picture. The intra BC prediction unit obtains intra BC encoding information on the current region from the entropy decoding unit 210. The intra BC prediction unit obtains a block vector value of the current region indicating a specific region in the current picture. The intra BC prediction unit may perform intra BC prediction using the obtained block vector value. The intra BC encoding information may include block vector information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
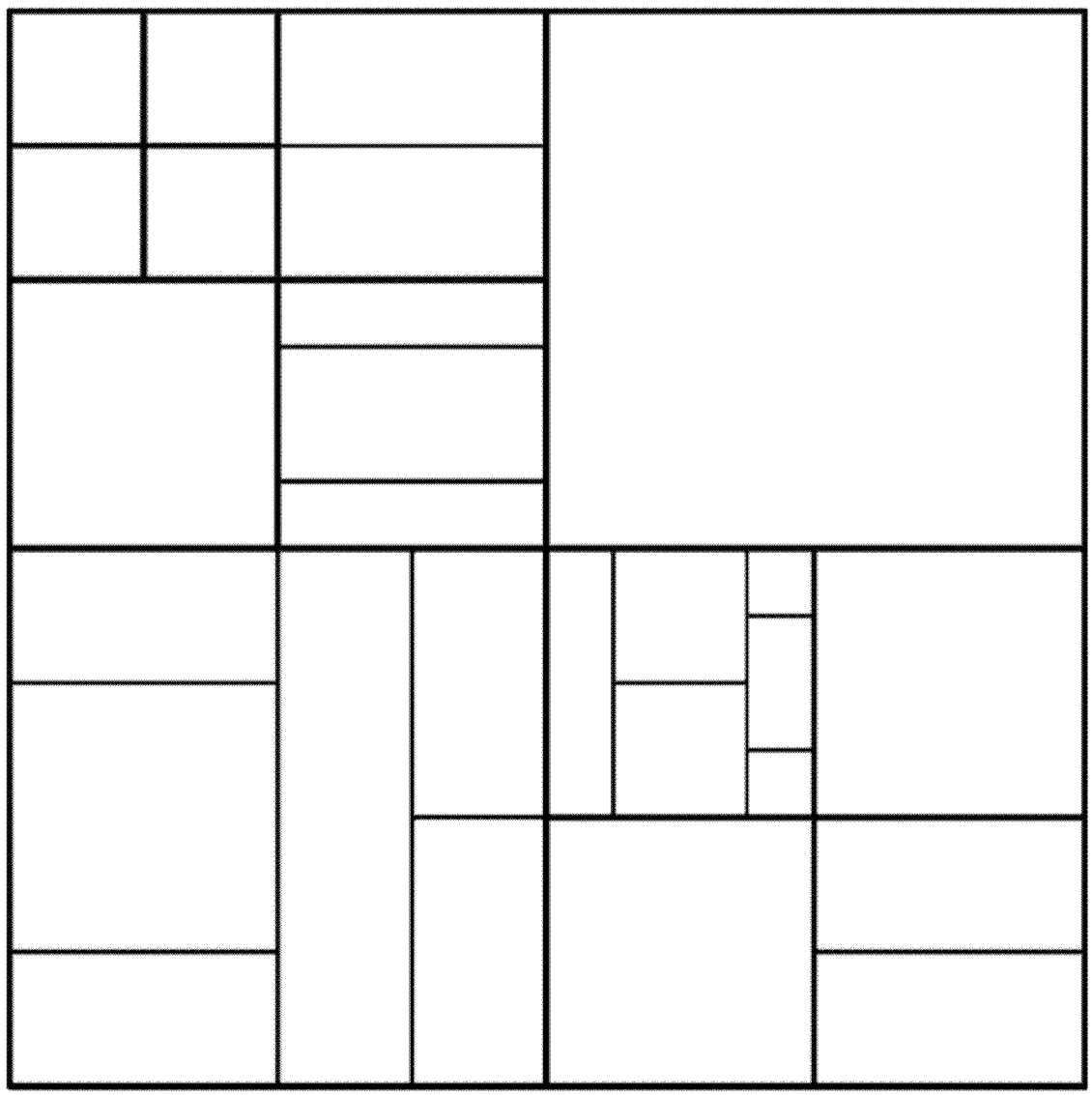
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of a multi-type tree may be a coding unit. When a coding unit is not larger compared to a maximum conversion length, the coding unit may be used as a unit of prediction and/or conversion without being split further. In an embodiment, when a width or height of a current coding unit is larger than the maximum conversion length, the current coding unit may be split into a plurality of conversion units without explicit signalling about split. On the other hand, at least one of the following parameters in the above-described quad tree and multi-type tree may be pre-defined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
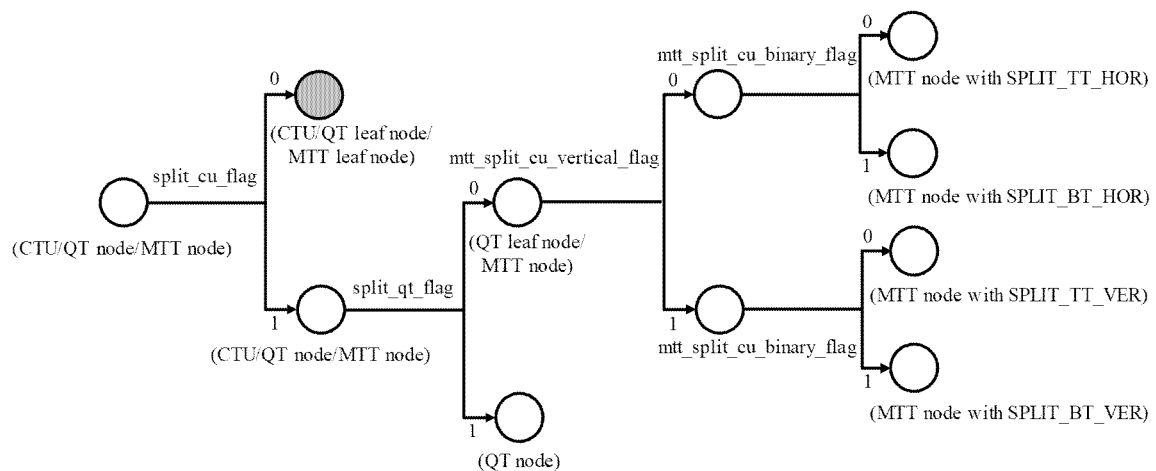
FIG. 4 shows an embodiment of a method for signaling a division of a quad tree and a multi-type tree.

FIG. 4 illustrates an embodiment of a method for signaling a quad tree and multi-type tree split. Preset flags may be used to signal the quad tree and multi-type tree split described above. With reference to FIG. 4, at least one of a flag 'split_cu_flag' indicating whether or not a node is split, a flag 'split_qt_flag' indicating whether or not a quad tree node is split, a flag 'mtt_split_cu_vertical_flag' indicating a split direction of the multi-type tree node, or a flag 'mtt_split_cu_binary_flag' indicating the split shape of the multi-type tree node may be used.

According to an embodiment of the present invention, 'split_cu_flag', which is a flag indicating whether or not the current node is split, may be signaled first. When the value of 'split_cu_flag' is 0, it indicates that the current node is not split, and the current node becomes a coding unit. When the current node is a coding tree unit, the coding tree unit includes one non-split coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes a coding unit.

When the value of 'split_cu_flag' is 1, the current node may be split into nodes of a quad tree or a multi-type tree according to the value of 'split_qt_flag'. The coding tree unit is a root node of a quad tree, and may be first split into a quad tree structure. In the quad-tree structure, 'split_qt_flag' is signaled for each node 'QT node'. When the value of 'split_qt_flag' is 1, the node is split into 4 square nodes, and when the value of 'split_qt_flag' is 0, the node becomes the leaf node of the quad tree 'QT leaf node', and the node is split into multi-type tree nodes. According to an embodiment of the present invention, the quad-tree split may be limited according to the type of the current node. When the current node is a coding tree unit (root node of the quad tree) or a quad tree node, quad-tree split may be allowed, and when the current node is a multi-type tree node, the quad tree split may not be allowed. Each quad tree leaf node 'QT leaf node' may be further split into multi-type tree structures. As described above, when 'split_qt_flag' is 0, the current node may be split into multi-type nodes. In order to indicate the split direction and split shape, 'mtt_split_cu_vertical_flag' and 'mtt_split_cu_binary_flag' may be signaled. When the value of 'mtt_split_cu_vertical_flag' is 1, the vertical split of the node 'MTT node' is indicated, and when the value of 'mtt_split_cu_vertical_flag' is 0, the horizontal split of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

Picture prediction (motion compensation) for coding is performed on coding units that are no longer split (that is, leaf nodes of the coding unit tree). The basic unit that performs such prediction is hereinafter referred to as a prediction unit or a prediction block.

Hereinafter, the term unit used in the present specification may be used as a term for replacing the prediction unit, which is a basic unit for performing prediction. However, the present invention is not limited thereto, and may be more broadly understood as a concept including the coding unit.

Figure 6:
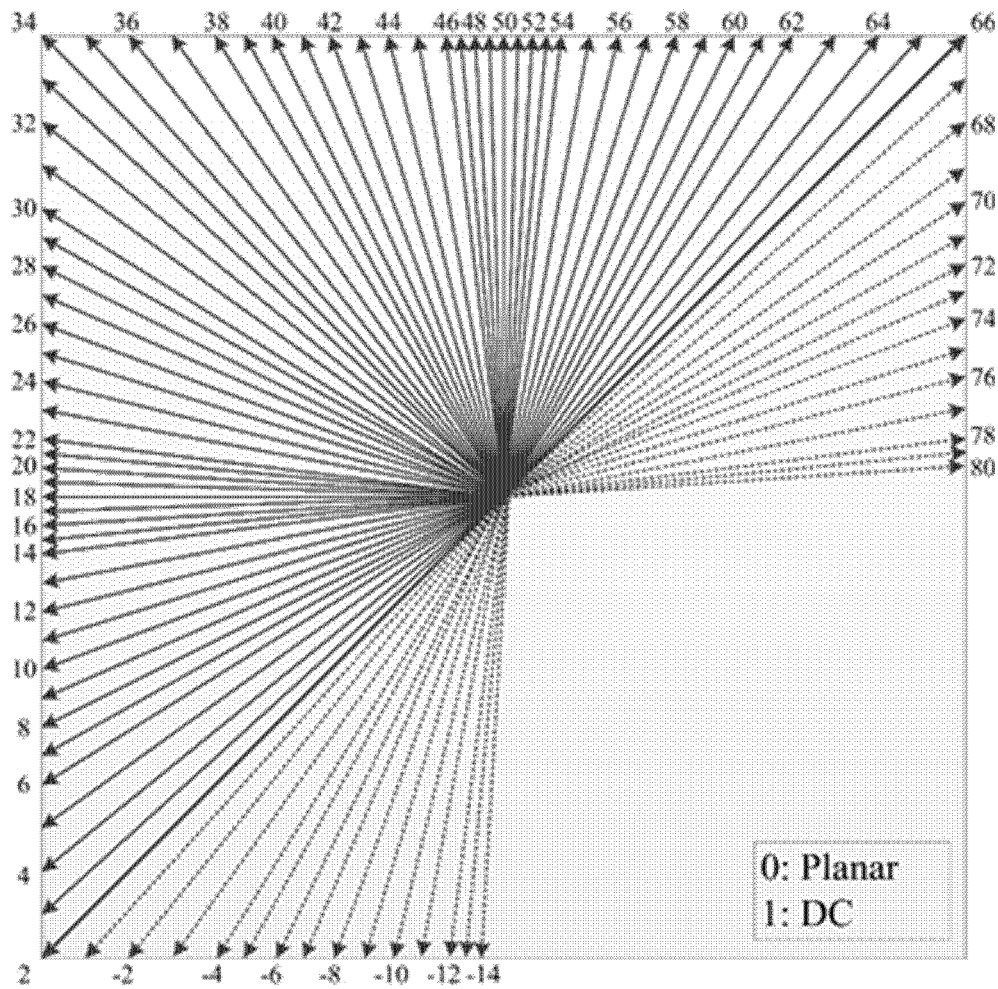

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, performing filtering on surrounding samples and/or reference samples obtained by a reference sample padding process may be performed to obtain filtered reference samples. The intra prediction unit predicts the samples of the current block using the reference samples thus obtained. The intra prediction unit predicts samples of the current block by using reference samples that have not been filtered or reference samples that have been filtered. In the present disclosure, surrounding samples may include samples on at least one reference line. For example, the surrounding samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, a preset angle range may be differently set according to a shape of a current block. For example, when a current block is a rectangular block, a wide-angle mode indicating an angle that exceeds 45 degrees or is less than −135 degrees in a clockwise direction may be additionally used. When a current block is a horizontal block, the angle mode may indicate an angle that falls within an angle range (i.e., second angle range) between (45+offset1) degrees and (−135+offset1) degrees in a clockwise direction. Here, angle modes 67 to 76 outside the first angle range may be additionally used. Furthermore, when the current block is a vertical block, the angle mode may indicate an angle that falls within an angle range (i.e., third angle range) between (45−offset2) degrees and (−135−offset2) degrees in a clockwise direction. Here, angle modes −10 to −1 outside the first angle range may be additionally used. According to an embodiment of the present invention, values of offset1 and offset2 may be differently determined according to a ratio between a width and height of a rectangular block. Furthermore, offset1 and offset2 may be positive numbers.

According to an additional embodiment of the present invention, a plurality of angle modes constituting an intra prediction mode set may include a basic angle mode and an extended angle mode. Here, the extended angle mode may be determined on the basis of the basic angle mode.

According to an embodiment, the basic angle mode may be a mode corresponding to an angle used in intra prediction of an existing High Efficiency Video Coding (HEVC) standard, and the extended angle mode may be a mode corresponding to an angle newly added in intra prediction of a next-generation video codec standard. In more detail, the basic angle mode may be an angle mode corresponding to any one of intra prediction modes {2, 4, 6, . . . , 66}, and the extended angle mode may be an angle mode corresponding to any one of intra prediction modes {3, 5, 7, . . . , 65}. Namely, the extended angle mode may be an angle mode between basic angle modes within the first angle range. Therefore, an angle indicated by the extended angle mode may be determined on the basis of an angle indicated by the basic angle mode.

According to another embodiment, the basic angle mode may be a mode corresponding to an angle within the preset first angle range, and the extended angle mode may be a wide-angle mode outside the first angle range. Namely, the basic angle mode may be an angle mode corresponding to any one of intra prediction modes {2, 3, 4, . . . , 66}, and the extended angle mode may be an angle mode corresponding to any one of intra prediction modes {40, –9, . . . , –1} and {67, 68, . . . , 76}. An angle indicated by the extended angle mode may be determined as an opposite angle to an angle indicated by a corresponding basic angle mode. Therefore, an angle indicated by the extended angle mode may be determined on the basis of an angle indicated by the basic angle mode. Meanwhile, the number of extended angle modes is not limited thereto, and additional extended angles may be defined according to a size and/or shape of a current block. For example, the extended angle mode may be defined as an angle mode corresponding to any one of intra prediction modes {–14, –13, . . . , –1} and {67, 68, . . . , 80}. Meanwhile, the total number of intra prediction modes included in the intra prediction mode set may be varied according to the above-mentioned configurations of the basic angle mode and extended angle mode.

In the above embodiments, an interval between extended angle modes may be set on the basis of an interval between corresponding basic angle modes. For example, the interval between the extended angle modes {3, 5, 7, . . . , 65} may be determined on the basis of the interval between the corresponding basic angle modes {2, 4, 6, . . . , 66}. Furthermore, the interval between the extended angle modes {–10, –9, . . . , –1} may be determined on the basis of the interval between the corresponding opposite basic angle modes {56, 57, . . . , 65}, and the interval between the extended angle modes {67, 68, . . . , 76} may be determined on the basis of the interval between the corresponding opposite basic angle modes {3, 4, . . . , 12}. The interval between extended angle modes may be set equal to an angle interval between corresponding basic angle modes. Furthermore, the number of extended angle modes in the intra prediction mode set may be set equal to or less than the number of basic angle modes.

According to an embodiment of the present invention, the extended angle mode may be signalled on the basis of the basic angle mode. For example, a wide-angle mode (i.e., extended angle mode) may replace at least one angle mode (i.e., basic angle mode) within the first angle range. A replaced basic angle mode may be an angle mode corresponding to an opposite side of the wide-angle mode. Namely, the replaced basic angle mode is an angle mode corresponding to an angle opposite to an angle indicated by the wide-angle mode or corresponding to an angle that differs by as much as a preset offset index from the opposite angle. According to an embodiment of the present invention, the preset offset index is 1. An intra prediction mode index corresponding to the replaced basic angle mode may be re-mapped to a wide-angle mode so as to signal the wide-angle mode. For example, the wide-angle modes {–10, –9, . . . , –1} may be signalled by the intra prediction mode indices {57, 58, . . . , 66} respectively, and the wide-angle modes {67, 68, . . . , 76} may be signalled by the intra prediction mode indices {2, 3, . . . , 11} respectively. As described above, since the intra prediction mode index for the basic angle mode signals the extended angle mode, intra prediction mode indices of the same set may be used to signal an intra prediction mode even if angle modes used in intra prediction of each block have different configurations. Therefore, a signalling overhead due to a change in an intra prediction mode configuration may be minimized.

Meanwhile, whether to use the extended angle mode may be determined on the basis of at least one of a shape and size of a current block. According to an embodiment, the extended angle mode may be used for intra prediction of the current block when the size of the current block is larger than a preset size; otherwise, only the basic angle mode may be used for intra prediction of the current block. According to another embodiment, the extended angle mode may be used for intra prediction of the current block when the current block is a block other than a square, and only the basic angle mode may be used for intra prediction of the current block when the current block is a square block.

The intra prediction unit determines reference samples and/or interpolated reference samples to be used in intra prediction of the current block on the basis of intra prediction mode information of the current block. When the intra prediction mode index indicates a particular angle mode, a reference sample or interpolated reference sample corresponding to the particular angle from a current sample of the current block is used in prediction of a current pixel. Therefore, reference samples and/or interpolated reference samples of different sets may be used in intra prediction according to an intra prediction mode. When intra prediction of the current block has been performed using reference samples and intra prediction mode information, the decoder restores sample values of the current block by adding a residual signal of the current block obtained from the inverse transform unit to an intra prediction value of the current block.

Figure 7:
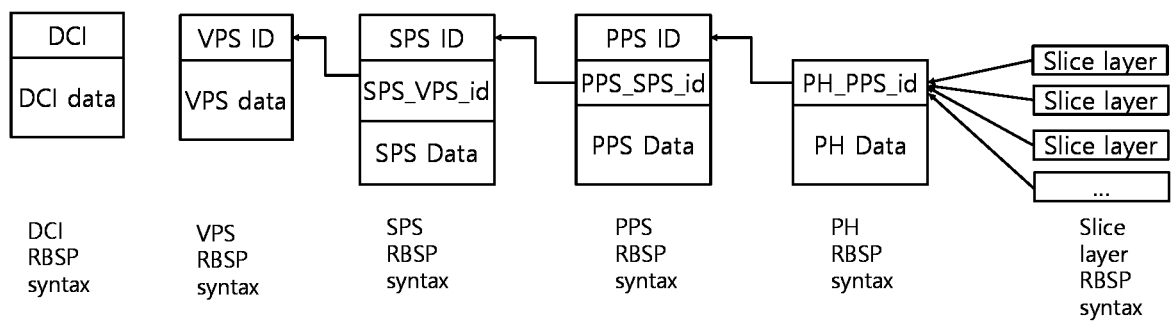
FIG. 7 is a diagram illustrating a portion of a high level syntax structure according to an embodiment of the present invention.

FIG. 7 is a diagram illustrating a portion of a high level syntax structure according to an embodiment of the present invention. Referring to FIG. 7, the decoder may decode an image according to a determined rule from a bitstream that is a result of video encoding, and may output the image. A syntax element is each piece of information included in a bitstream according to a series of determined rules, and a syntax structure is a configuration of syntax elements. The syntax elements may be aligned in units of bytes and encapsulated as a network abstraction layer (NAL) unit, and this is referred to as a raw byte sequence payload (RBSP). The syntax elements may be encoded in units of the NAL unit and stored in a bitstream or transmitted. Various types of NAL units may be defined. The NAL units may be classified as a video coding layer (VCL) and a non-VCL according to whether they are information about compression of contents of video data itself or additional information for compression. The NAL unit divided into a non-VCL class may include a VPS RBSP syntax, an SPS RBSP syntax, a PPS RBSP syntax, a picture header (PH) RBSP syntax, a slice layer RBSP syntax, and the like. When a bitstream is generated or transmitted as a result of image compression, the NAL units may be configured in the order of VPS NAL unit, SPS NAL unit, PPS NAL unit, PH NAL unit, and slice layer NAL unit. The number and order of the NAL units may be changed according to an environment of image compression. An access unit delimiter (AUD) NAL unit and a decoding capability information (DCI) NAL unit may precede the VPS RBSP syntax. FIG. 7 shows a reference relationship between lower syntaxes in a higher syntax. In particular, syntax elements to be commonly used in a video sequence or picture (lower picture) unit or a slice unit in order to decode a first picture in a bitstream may have the relationship shown in FIG. 7. As an example of the reference relationship, parameters defined in the VPS RBSP syntax referenced based on SPS VPS id defined in the SPS RBSP syntax may be commonly applied to the corresponding video sequence. Some parameters may be re-defined/updated in a lower syntax. The terms about a syntax structure used herein may indicate a syntax structure including a partial name even if the terms are mentioned as the partial name rather than a full name. Furthermore, signalling/parsing for the syntax structure and syntax element of the present invention may be similarly applied during encoding/decoding.

FIG. 8 is a diagram illustrating a network abstract layer (NAL) unit type according to an embodiment of the present invention.

The NAL units may be roughly classified as two classes. NAL units corresponding to video data information may be classified as a VCL, and NAL units including information that is not video data information but is required for decoding a video may be classified as a non-VCL. The NAL units classified as a VCL may also have various NAL unit types according to an application method. Information about an NAL unit type may be included in NAL unit header information. The decoder may identify a NAL unit using an NAL unit type indicated in header information in a transport/network layer. In FIG. 8, an NAL unit type (nal_unit_type), the name of an NAL unit type (Name of nal_unit_type), the content of an NAL unit and RBSP syntax structure, and an NAL unit type class may be confirmed. Referring to FIG. 8, information about the NAL units shown in FIG. 7 may be confirmed.

Figure 9:
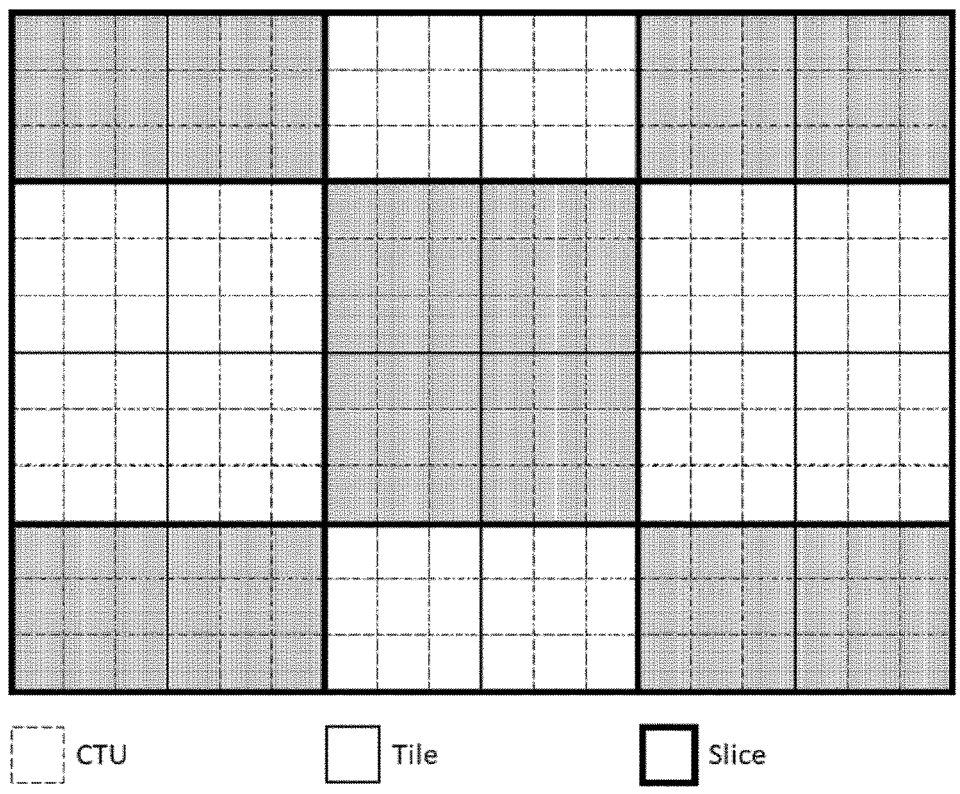
FIG. 9 is a diagram illustrating that one picture is split into CTUs, tiles, and slices according to an embodiment of the present invention.

FIG. 9 is a diagram illustrating that one picture is split into CTUs, tiles, and slices according to an embodiment of the present invention.

For various reasons, a picture/frame may be divided into coding blocks/units of a preset size or an assembly thereof. A coding unit (CU) may be a coding block of luma samples and a coding block corresponding to samples of two chroma components, and may have three sample arrays. A coding tree block (CTB) may be configured with a coding tree unit (CTU) of a luma component and two chroma components. A tile is a rectangular area in a picture, and may include CTUs within a tile column and tile row of a particular size. A slice may be configured with tiles of an integer size or successive CTU columns of an integer size. A slice may be transmitted as a single NAL unit.

In detail, FIG. 9 illustrates that one picture is configured with 18×12 luma CTUs and split into 24 tiles and 9 rectangular slices according to an embodiment of the present invention. The splitting of the picture shown in FIG. 9 is merely an example, and a picture may be split in various forms without being limited to the example illustrated in FIG. 9. A picture may be split into not only rectangular slices but also raster-scan-type slices. Furthermore, a tile may be split into shapes of different sizes.

Figure 10:
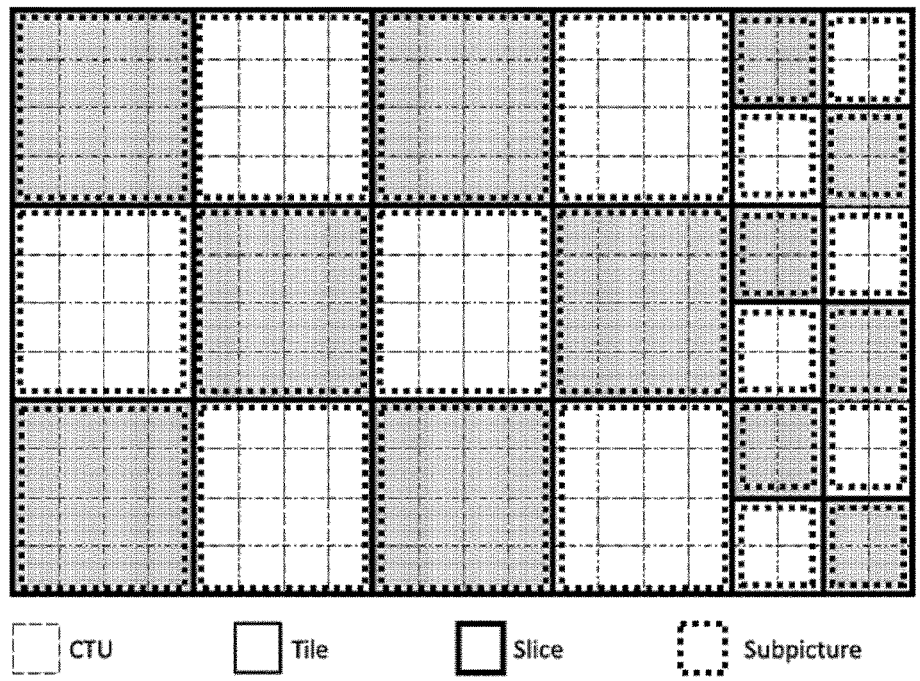
FIG. 10 is a diagram illustrating that one picture is split into a plurality of sub-pictures according to an embodiment of the present invention.

FIG. 10 is a diagram illustrating that one picture is split into a plurality of sub-pictures according to an embodiment of the present invention.

In detail, FIG. 10 illustrates that one picture is split into a plurality of lower pictures (hereinafter referred to as sub-pictures) according to an embodiment of the present invention. Referring to FIG. 10, one picture may be configured by being split into 15 tiles and 24 slices, and may be split into 24 sub-pictures. When one picture is split into a plurality of sub-pictures, encoding/decoding may be performed on a per-sub-picture basis. Furthermore, a new picture may be configured with a particular sub-picture or sub-pictures, and a new picture may also be configured with sub-pictures of another video coding layer (VCL).

FIG. 11 is a diagram illustrating a sequence parameter set RBSP syntax structure according to an embodiment of the present invention.

Syntax elements included in the SPS RBSP syntax structure will be described with reference to FIG. 11.

sps_decoding_parameter_set_id is a syntax element indicating whether to refer to DPS in SPS. When a value of sps_decoding_parameter_set_id is larger than 0, this syntax element indicates dps_decoding_parameter_set id of a decoding parameter set (DPS) referred to in SPS. On the contrary, when the value of sps_decoding_parameter_set_id is 0, this syntax element may indicate that DPS is not referred to in the corresponding SPS. All SPSs referred to by coded pictures of a bitstream are required to have the same value of sps_decoding_parameter_set_id.

sps_video_parameter_set_id is a syntax element indicating whether to refer to VPS in SPS. When a value of sps_video_parameter_set_id is larger than 0, it may indicate vps_video_parameter_set_id for VPS referred to in SPS. On the contrary, when the value of sps_video_parameter_set_id is 0, the corresponding SPS may not refer to VPS. Furthermore, when the value of sps_video_parameter_set_id is 0, a value of vps_max_layers_minus1 may be inferred as 0. Furthermore, when the value of sps_video_parameter_set_id is 0, a coded video sequence (CVS) may include only one layer.

sps_seq_parameter_set_id is a syntax element, which provides an ID for SPS so as to be referred to by other syntax elements. sps_seq_parameter_set_id may be used as information to be referred to in PPS.

subpics_present_flag is a syntax element indicating whether a parameter related to a sub-picture is present in the SPS RBSP syntax. When a value of subpics_present_flag is 1, it may indicate that a parameter (syntax element) related to a sub-picture is present in the SPS RBSP syntax, and when the value of subpics_present_flag is 0, it may indicate that a parameter (syntax element) related to a sub-picture is not present in the SPS RBSP syntax.

When the value of subpics_present_flag is 1, the parameters (syntax elements) related to a sub-picture, which are described below, may be signalled.

sps_num_subpics_minus1 is a syntax element indicating a value related to the number of sub-pictures. sps_num_subpics_minus1 indicates a value obtained by subtracting 1 from the number of sub-pictures. Namely, a value obtained by adding 1 to the value of sps_num_subpics_minus1 may indicate the number of sub-pictures. sps_num_subpics_minus1 may have a value between 0 and (MaxSlicesPerAu−1). Here, MaxSlicesPerAu may have a value between 16 and 600 according to a level. When sps_num_subpics_minus1 is not present, the value of sps_num_subpics_minus1 may be inferred as 0.

Referring to FIG. 11, when sps_num_subpics_minus1 is present, syntax elements defined for each sub-picture may be signalled. Syntax elements indicating coordinate information of an upper left start point of a sub-picture, a width of a sub-picture, a height of a sub-picture, information indicating whether a sub-picture is considered as a picture, and information indicating whether a loop filter is applied may be signalled.

subpic_ctu_top_left_x[i] is a syntax element indicating, in units of CtbSizeY, a horizontal axis position of an upper left CTU of an i-th sub-picture. Here, the horizontal axis position may be indicated in a coordinate form. CtbSizeY represents a size of a luma component CTB. CtbSizeY may be determined as 1<<CtbLog2SizeY, wherein CtbLog2SizeY may be determined as a value obtained by calculating sps_log2_ctu_size_minus5+5. CtbLog2SizeY represents a value obtained by taking log2 of a size of CTB of a luma component. Here, the symbol "<<", which is a left shift operator, represents that an operand input to the operator is binarized, and the binarized operand is leftward shifted by as much as a shift parameter. The number of bits of subpic_ctu_top_left_x[i] may be determined as a value obtained by calculating Ceil(Log2(pic width max in luma samples/CtbSizeY)). Here, Ceil(A) is a function, which returns a smallest number that is larger than a real number A. When subpic_ctu_top_left_x[i] is not present, a value of subpic_ctu_top_left_x[i] may be inferred as 0.

subpic_ctu_top_left_y[i] is a syntax element indicating, in units of CtbSizeY, a vertical axis position of an upper left CTU of an i-th sub-picture. Here, the vertical axis position may be indicated in a coordinate form. The number of bits of subpic_ctu_top_left_y[i] may be determined as a value obtained by calculating Ceil(Log2(pic width max in luma samples/CtbSizeY)). When subpic_ctu_top_left_y[i] is not present, a value of subpic_ctu_top_left_y[i] may be inferred as 0. pic width max in luma samples is a syntax element indicating a maximum width of each decoded picture referring to SPS.

subpic_width_minus1[i] is a syntax element indicating a value related to a width of an i-th sub-picture. subpic_width_minus1[i] indicates a value obtained by subtracting 1 from a width of an i-th sub-picture. Namely, a value obtained by adding 1 to the value of subpic_width_minus1[i] may be a value indicating a width of an i-th sub-picture. Here, the value indicating a width of a sub-picture may be expressed in units of CtbSizeY. The number of bits of subpic_width_minus1[i] may be determined as a value obtained by calculating Ceil(Log2(pic width max in luma samples/CtbSizeY)). When subpic_width_minus1[i] is not present, a width of a sub-picture may be inferred as Ceil(pic width max in luma samples/CtbSizeY)−1.

subpic_height_minus1[i] is a syntax element indicating a value related to a height of an i-th sub-picture. subpic_height_minus1[i] indicates a value obtained by subtracting 1 from a height of an i-th sub-picture. Namely, a value obtained by adding 1 to the value of subpic_height_minus1[i] may be a value indicating a height of an i-th sub-picture. Here, the value indicating a height of a sub-picture may be expressed in units of CtbSizeY. The number of bits of subpic_height_minus1[i] may be determined as a value obtained by calculating Ceil(Log2(pic_height_max_in_luma_samples/CtbSizeY)). pie height max in luma samples is a syntax element indicating a maximum height of each decoded picture referring to SPS. When subpic_height_minus1[i] is not present, a height of a sub-picture may be inferred as Ceil(pic_height_max_in_luma_samples/CtbSizeY)−1.

subpic_treated_as_pic_flag[i] is a syntax element indicating whether the decoder considers an i-th sub-picture as one picture to perform decoding. When a value of subpic_treated_as_pic_flag[i] is 1, an i-th sub-picture in an individually coded picture within a coded layer video sequence (CLVS) may be treated as one picture during a decoding process except for loop filtering. When the value of subpic_treated_as_pic_flag[i] is 0, it may indicate that an i-th sub-picture in an individually coded picture within a CLVS is not treated as one picture during a decoding process except for loop filtering. When subpic_treated_as_pic_flag[i] is not present, a value of subpic_treated_as_pic_flag[i] may be inferred as 0.

Loop_filter_across_subpic_enabled_flag[i] is a syntax element indicating whether a loop filter is able to be operated at a sub-picture boundary. When a value of Loop_filter_across_subpic_enabled_flag[i] is 1, it indicates that a loop filter is able to be operated at a sub-picture boundary. The loop filter may be applied to each coded i-th sub-picture within a CLVS. When the value of Loop_filter_across_subpic_enabled_flag[i] is 0, it indicates that that loop filter is not operated at a sub-picture boundary. When Loop_filter_across_subpic_enabled_flag[i] is not present, the value of Loop_filter_across_subpic_enabled_flag[i] may be inferred as 1.

Furthermore, the parameters (syntax elements) related to a sub-picture, which are described below, may be additionally signalled.

sps_subpic_id_present_flag is a syntax element indicating whether sub-picture ID mapping is present in SPS. When a value of sps_subpic_id_present_flag is 1, it indicates that sub-picture ID mapping is present in SPS. A sub-picture ID may be re-set/mapped as a new ID value instead of a default set value. When a value of sps_subpic_id_present_flag is 0, it indicates that sub-picture ID mapping is not present in SPS. sps_subpic_id_present_flag described in the present disclosure may be described as sps_subpic_id_mapping_explicitly_signalled_flag.

sps_subpic_id_signalling_present_flag is a syntax element indicating whether information related to sub-picture ID mapping is signalled in SPS. When a value of sps_subpic_id_signalling_present_flag is 1, information (mapping value) related to sub-picture ID mapping is signalled in SPS. When the value of sps_subpic_id_signalling_present_flag is 0, information (mapping value) related to sub-picture ID mapping is not signalled in SPS. When sps_subpic_id_signalling_present_flag is not present, the value of sps_subpic_id_signalling_present_flag may be inferred as 0. sps_subpic_id_signalling_present_flag described in the present disclosure may be described as sps_subpic_id_mapping_present_flag.

sps_subpic_id_len_minus1 is a syntax element indicating a value related to the number of bits for expressing a value of sps_subpic_id[i] described below. sps_subpic_id_len_minus1 indicates a value obtained by subtracting 1 from the number of bits for expressing the value of sps_subpic_id[i]. Namely, a value obtained by adding 1 to the value of sps_subpic_id_len_minus1 may indicate the number of bits for expressing the value of sps_subpic_id[i]. sps_subpic_id_len_minus1 may have a value between 0 and 15.

sps_subpic_id[i] is a syntax element indicating a sub-picture ID value of an i-th sub-picture. The number of bits for expressing a value of sps_subpic_id[i] may be calculated as sps_subpic_id_len_minus1+1. When sps_subpic_id[i] is not present and the value of sps_subpic_id_present_flag is 0, the sub-picture ID value of an i-th sub-picture may be a value between 0 and the value of sps_num_subpics_minus1. Referring to FIG. 11, the sub-picture ID value may be determined as a value of i that increases in increments of 1 due to the for-loop in the if(subpics_present_flag) syntax. When sps_subpic_id[i] is not present and the value of sps_subpic_id_present_flag is 0, the number of bits for expressing the value of sps_subpic_id[i] may be inferred as a value obtained by calculating Ceil(Log2 (sps_num_subpics_minus1+1)).

In FIG. 11, in order for the syntax element sps_subpic_id[i] to be signalled, the value of sps_subpic_id_present_flag indicating whether sub-picture ID mapping is present is required to be 1. Furthermore, the value of sps_subpic_id_signalling_present_flag indicating that a mapped sub-picture ID value is signalled in SPS is required to be 1. Then, the encoder/decoder may signal/parse sps_subpic_id_len_minus1 that is a syntax element indicating the number of bits for expressing a sub-picture ID value, and the encoder may inform the decoder of the value of sps_subpic_id[i] by as many as the number of previously signalled sub-pictures.

FIG. 12 is a diagram illustrating a picture parameter set RBSP syntax structure according to an embodiment of the present invention.

Referring to FIG. 12, syntax elements included in the PPS RBSP syntax structure are described below.

pps_pic_parameter_set_id is a syntax element, which distinguishably indicates PPS so as to be referred to by other syntax elements. pps_pic_parameter_set_id may have a value between 0 and 63.

pps_seq_parameter_set_id is a syntax element indicating a value corresponding to sps_seq_parameter_set_id for referring to SPS. A value of pps_seq_parameter_set_id is required to be the same in all PPSs referred to by coded pictures within a CLVS.

pic_width_in_luma_samples is a syntax element indicating a width of a coded picture referring to PPS in units of luma sample. A value of pic_width_in_luma_samples is not 0 and is required to be expressed as a multiple of Max(8, MinCbSizeY) and required to be equal to or less than a value of pic_width_max_in_luma_samples. pic_width_max_in_luma_samples may indicate a maximum width of a picture by the number of luma samples. When the value of subpics_present_flag is 1 or the value of ref_pic_resampling_enabled_flag is 0, the value of pic_width_in_luma_samples is required to be equal to the value of pic_width_max_in_luma_samples. Max(a, b) is a function that returns a larger value among "a" and "b".

pic_height_in_luma_samples is a syntax element indicating a height of each decoded picture referring to PPS in units of luma sample. A value of pic_height_in_luma_samples is not 0 and is required to be expressed as a multiple of Max(8, MinCbSizeY) and required to be equal to or less than a value of pic_height_max_in_luma_samples.

The four syntax elements pps_subpic_id_signalling_present_flag, pps_num_subpics_minus1, pps_subpic_id_len_minus1, and pps_subpic_id[i] described below are syntax elements in PPS related to a sub-picture.

pps_subpic_id_signalling_present_flag is a syntax element indicating whether sub-picture ID mapping is signalled in PPS. When a value of pps_subpic_id_signalling_present_flag is 1, it indicates that sub-picture ID mapping is signalled in PPS. When the value of pps_subpic_id_signalling_present_flag is 0, it indicates that sub-picture ID mapping is not signalled in PPS. Furthermore, when the value of sps_subpic_id_present_flag is 0 or the value of sps_subpic_id_signalling_present_flag is 1, the value of pps_subpic_id_signalling_present_flag is required to be 0.

pps_num_subpics_minus1 is a syntax element indicating a value related to the number of sub-pictures in a coded picture referring to PPS. A value of pps_num_subpics_minus1 is a value obtained by subtracting 1 from the number of sub-pictures in a coded picture referring to PPS. Namely, a value obtained by adding 1 to the value of pps_num_subpics_minus1 may indicate the number of sub-pictures in a coded picture referring to PPS. As a bitstream match condition, the value of pps_num_subpic_minus1 is required to be equal to the value of sps_num_subpics_minus1.

pps_subpic_id_len_minus1 is a syntax element indicating a value related to the number of bits used to express pps_subpic_id[i]. A value of pps_subpic_id_len_minus1 indicates a value obtained by subtracting 1 from the number of bits used to express pps_subpic_id[i]. Namely, a value obtained by adding 1 to the value of pps_subpic_id_len_minus1 indicates the number of bits used to express pps_subpic_id[i]. The value of pps_subpic_id_len_minus1 may range from 0 to 15. As a bitstream match condition, the value of pps_subpic_id_len_minus1 is required to be the same in all PPSs referred to in coded pictures within a CLVS.

pps_subpic_id[i] is a syntax element indicating a sub-picture ID value of an i-th sub-picture. A length (number of bits) of pps_subpic_id[i] may be equal to a value obtained by calculating pps_subpic_id_len_minus1+1.

FIG. 13 is a diagram illustrating a picture header RBSP syntax structure according to an embodiment of the present invention.

Referring to FIG. 13, syntax elements included in the picture header RBSP syntax structure are described below.

ph_pic_parameter_set_id is a syntax element indicating a value corresponding to pps_pic_parameter_set_id defined in PPS. ph_pic_parameter_set_id may have a value between 0 and 63.

ph_subpic_id_signalling_present_flag is a syntax element indicating whether sub-picture ID mapping signalling is able to be transmitted in a picture header. When a value of ph_subpic_id_signalling_present_flag is 1, it indicates that sub-picture ID mapping signalling is able to be transmitted in a picture header. When the value of ph_subpic_id_signalling_present_flag is 0, it indicates that sub-picture-picture ID mapping signalling is not transmitted in a picture header.

ph_subpic_id_len_minus1 is a syntax element indicating a value related to the number of bits used to express ph_subpic_id[i]. ph_subpic_id_len_minus1 may indicate a value obtained by subtracting 1 from the number of bits used to express ph_subpic_id[i]. Namely, a value obtained by adding 1 to the value of ph_subpic_id_len_minus1 may be the number of bits used to express ph_subpic_id[i]. Here, the value of pic_subpic_id_len_minus1 may be between 0 and 15. As a bitstream match condition, the value of ph_subpic_id_len_minus1 is required to be the same in all PHs referred to by a coded picture within a CLVS.

ph_subpic_id[i] is a syntax element indicating an i-th sub-picture ID value. The number of bits for expressing ph_subpic_id[i] may be calculated as ph_subpic_id_len_minus1+1.

SubpicIdList[i] is a syntax element used to determine a value of slice_subpic_id in a slice header.

A method of deriving SubpicIdList[i] is expressed by Equation 1.

for($i=0;i<=$sps_num_subpics_minus1;$i$++) SubpicIdList[$i$]=sps_subpic_id_present_flag ? (sps_ subpic_id_signalling_present_flag ? sps_subpi-
c_id[*i*]: (ph_subpic_id_signalling_present_flag ?
ph_subpic_id[*i*]: pps_subpic_id[*i*])):*i*  [Equation 1]

"?" is a conditional operator, and A=B?C:D indicates that A becomes a value of C if condition B is true and becomes a value of D if condition B is false.

Referring to Equation 1, a value of SubpicIdList[i] is determined according to the value of sps_subpic_id_signalling_present_flag when the value of sps_subpic_id_present_flag is 1. Here, when the value of sps_subpic_id_signalling_present_flag is 1, the value of SubpicIdList[i] is the same as the value of sps_subpic_id[i]. When the value of sps_subpic_id_signalling_present_flag is 0, the value of SubpicIdList[i] is determined according to the value of ph_subpic_id_signalling_present_flag. Here, when the value of ph_subpic_id_signalling_present_flag is 1, the value of SubpicIdList[i] is the same as the value of ph_subpic_id[i]. When the value of ph_subpic_id_signalling_present_flag is 0, the value of SubpicIdList[i] is the same as the value of pps_subpic_id[i].

Meanwhile, the value of SubpicIdList[i] is equal to an index i when the value of sps_subpic_id_present_flag is 0.

FIG. 14 is a diagram illustrating a picture header RBSP syntax structure according to an embodiment of the present invention.

In detail, FIG. 14 shows that ph_subpic_id[i] is always signalled/parsed in the picture header RBSP syntax structure.

There may be a case where the value of ph_subpic_id[i] is not present according to a condition on which SubpicIdList[i] described in FIG. 13 is signalled/parsed. For example, as shown in Equation 1, when the value of sps_subpic_id_present_flag is 1, the value of sps_subpic_id_signalling_present_flag is 0, and the value of ph_subpic_id_signalling_present_flag is 0, SubpicIdList[i]=pps_subpic_id[i]. However, there may be a case where the value of pps_subpic_id[i] is not present. Since a condition (i.e., sps_subpic_id_present_flag && ! sps_subpic_id_signalling_ flag) is not considered when signalling/parsing pps_subpic_id_signalling_present_flag, the value of pps_subpics_id_signalling_present_flag may be 0. A sub-picture ID value may not be transmitted in PPS when the value of pps_subpic_id_signalling_present_flag is 0, and thus the value of pps_subpic_id[i] may not be present. FIG. 14 illustrates an example for resolving this issue. Referring to FIG. 14, there is a condition for signalling/parsing ph_subpic_id[i] in the picture header RBSP syntax structure. Namely, when sps_subpic_id_present_flag && !sps_subpic_id_signalling_flag is true, ph_subpic_id_len_minus1 and ph_subpic_id[i] may be signalled/parsed. In a picture header, when sps_subpic_id_present_flag is true (i.e., the value of sps_subpic_id_present_flag is 1) and the value of sps_subpic_id_signalling_flag is 0, a sub-picture ID value not signalled in SPS may be transmitted. Transmitting a sub-picture ID value in a picture header may be regardless of whether a sub-picture ID value is present in PPS.

FIG. 15 is a diagram illustrating a picture header RBSP syntax structure according to an embodiment of the present invention.

FIG. 15 illustrates another method for always signalling/parsing the value of ph_subpic_id[i] in order to address the above-mentioned case where the value of SubpicIdList[i] is not present according to a signalling/parsing condition.

When the condition sps_subpic_id_present_flag && ! sps_subpic_id_signalling_flag && !pps_subpic_id signalling flag is true, ph_subpic_id_len_minus1 and ph_subpic_id[i] may be signalled/parsed. In other words, FIG. 15 proposes a format in which a condition related to pps_subpic_id signalling flag is added to the condition described with reference to FIG. 14. In addition to the condition proposed with reference to FIG. 14, when the value of pps_subpic_id_signalling_flag is 0, subpic_id[i] may not be signalled/parsed in the SPS RBSP syntax and the PPS RBSP syntax. In this case, it may be indicated that subpic_id[i] is required to be signalled/parsed in a picture header.

FIG. 16 illustrates a picture parameter set RBSP syntax structure and semantic according to an embodiment of the present invention.

FIG. 16 illustrates another method for always signalling/parsing the value of ph_subpic_id[i] in order to address the above-mentioned case where the value of SubpicIdList[i] is not present according to a signalling/parsing condition.

FIG. 16 illustrates that an additional condition is added to a semantic that describes pps_subpic_id_signalling_present_ flag in the picture header RBSP syntax structure described with reference to FIG. 13.

The additional condition is described below. [When sps_subpic_id_present_flag is equal to 1 and sps_subpic_id_signalling_present_flag is equal to 0, pps_subpic_id_signalling_present_flag shall be equal to 1]. In other words, when the value of sps_subpic_id_present_flag is 1 and the value of sps_subpic_id_signalling_present_flag is 0, the value of pps_subpic_id_signalling_present_flag may be set to 1. Namely, in the case where it is indicated that sub-picture ID mapping is present in SPS but a sub-picture ID value is not signalled in SPS, the value of pps_subpic_id_signalling_present_flag may be set to 1 in PPS, and a sub-picture ID value may be signalled/parsed in PPS. This is effective in terms of the degree of freedom of transmission of a sub-picture ID value since a sub-picture ID value is able to be transmitted in a picture header. When a sub-picture ID value is simultaneously transmitted in a picture header and in PPS as previously configured, the value of SubpicIdList[i] may be determined as a value of a picture header.

FIG. 17 is a diagram illustrating a method of determining an array variable SubpicIdList[i] according to an embodiment of the present invention.

In detail, FIG. 17 is a diagram illustrating a method for resolving an issue that may occur in Equation 1.

FIG. 17 shows that when sps_subpic_id_present_flag is true (i.e., has a value of 1), sps_subpic_id_signalling_present_flag is false (i.e., has a value of 0), and ph_subpic_id_signalling_present_flag is false (i.e., has a value of 0), the condition of pps_subpic_id_signalling_present_flag is checked again. The encoder/decoder may check the condition of pps_subpic_id_signalling_present_flag again, and may determine SubpicIdList[i] as pps_subpic_id[i] when pps_subpic_id_signalling_present_flag is true (i.e., has a value of 1) and determine SubpicIdList[i] as a value of index i when pps_subpic_id_signalling_present_flag is false (i.e., has a value of 0).

In addition, as a bitstream match condition, the condition that at least one of the values of sps_subpic_id_signalling_present_flag, pps_subpic_id_signalling_present_flag, and ph_subpic_id_signalling_present_flag is required to be 1 when the value of sps_subpic_id_present_flag is 1 may be considered.

[sps_subpic_id_present_flag equal to 1 specifies that sub-picture ID mapping is present in the SPS. sps_subpic_id_present_flag equal to 0 specifies that subpicture ID mapping is not present in the SPS. It is a requirement of bitstream conformance that the value of one of among sps_subpic_id_signalling_present_flag, pps_subpic_id_signalling_present_flag, and ph_subpic_id_signalling_present_flag shall be equal to 1.]

FIG. 18 is a diagram illustrating a sequence parameter set RBSP syntax structure according to an embodiment of the present invention.

FIG. 18 is a diagram illustrating a structure in which sps_subpic_id_present_flag included in the SPS RBSP syntax structure is signalled/parsed. sps_subpic_id_present_flag is a syntax element indicating whether sub-picture ID mapping is present, and may be meaningful when a sub-picture is present. Referring to FIG. 11, in SPS, sps_subpic_id_present_flag is signalled/parsed regardless of (regardless of true/false) a parsing result of subpics_present_flag indicating whether a sub-picture is present in a picture. Therefore, as described above, when the value of subpics_present_flag is 0, sps_subpic_id_present_flag is no longer meaningful. In other words, since sub-picture ID mapping is not obviously present if a sub-picture is not present in a picture, sps_subpic_id_present_flag that is a syntax element indicating whether sub-picture ID mapping is present is not necessary. Therefore, according to FIG. 18, sps_subpic_id_present_flag may be signalled/parsed when subpics_present_flag is true.

FIG. 19 is a diagram illustrating a sequence parameter set RBSP syntax structure according to an embodiment of the present invention.

In detail, FIG. 19 pertains to syntax elements related to a partition in the SPS RBSP syntax structure according to an embodiment of the present invention.

log2_min_luma_coding_block_size_minus2 is a syntax element indicating a value related to a minimum luma coding block size. log2_min_luma_coding_block_size_minus2 indicates a value obtained by subtracting 2 from a minimum luma coding block size. Namely, a value obtained by adding 2 to the value of log2_min_luma_coding_block_size_minus2 may indicate a minimum luma coding block size. Here, log2_min_luma_coding_block_size_minus2 may have a value between 0 and (sps_log2_ctu_size_minus5+3). sps_log2_ctu_size_minus5 is a syntax element indicating a value related to a size of a luma coding tree block of a coding tree unit. sps_log2_ctu_size_minus5 may be signalled/parsed in SPS, and may have a value between 0 and 2.

The variables MinCbLog2SizeY, MinCbSizeY, IbcBufWidthY, IbcBufWidthC, and Vsize which may be used in the present invention may be calculated using Equation 2.

$$MinCbLog2SizeY = log2\_min\_luma\_coding\_block\_size\_minus2+2$$

$$MinCbSizeY = 1 << MinCbLog2SizeY$$

$$IbcBufWidthY = 256*128/CtbSizeY$$

$$IbcBufWidthC = IbcBufWidthY/SubWidthC$$

$$VSize = Min(64, CtbSizeY) \quad \text{[Equation 2]}$$

MinCbLog2SizeY denotes a minimum luma coding block size in log2 units, MinCbSizeY denotes a minimum coding block size, IbcBufWidthY denotes a luma buffer size capable of storing a reference area necessary for intra block copy, and IbcBufWidthC denotes a chroma buffer size capable of storing a reference area necessary for intra block copy.

Min(a, b) is a function that returns a smaller value among "a" and "b". The variable MinCbSizeY is required to be equal to or less than VSize.

partition_constraints_override_enabled_flag is a syntax element indicating whether partition constraints override flag that is a partition constraint syntax element (flag) is present in a picture header referring to SPS. When a value of partition_constraints_override_enabled_flag is 1, it indicates that partition constraints override flag may be present in a picture header referring to SPS. When the value of partition_constraints_override_enabled_flag is 0, it indicates that partition_constraints_override_flag is not present in a picture header referring to SPS.

Log2 described in the present disclosure is a log2(A) operator.

sps_log2_diff_min_qt_min_cb_intra_slice_luma is a syntax element indicating a difference between a value obtained by taking a binary logarithm of a minimum size of luma samples of a luma leaf block that is a result of quad tree split of CTU and a value obtained by taking a binary logarithm of a minimum coding block size for a luma coding unit in slices of slice type 2 (I slice) referring to SPS. When the value of partition_constraints_override_enabled_flag is 1, sps_log2_diff_min_qt_min_cb_intra_slice_luma may be changed to the value of pic_log2_diff_min_qt_min_cb_luma_if_pic_log2_diff_min_qt_min_cb_luma is present in a picture header referring to SPS. sps_log2_diff_min_qt_min_cb_intra_slice_luma may have a value between 0 and (CtbLog2SizeY−MinCbLog2SizeY). The value (MinQtLog2SizeIntraY) obtained by taking a binary logarithm of a minimum size of luma samples of a luma leaf block that is a result of quad tree split of CTU may be calculated as shown in Equation 3.

$$MinQtLog2SizeIntraY = sps\_log2\_diff\_min\_qt\_min\_cb\_intra\_slice\_luma + MinCbLog2SizeY \quad \text{[Equation 3]}$$

sps_log2_diff_min_qt_min_cb_inter_slice is a syntax element indicating a difference between a value obtained by taking a binary logarithm of a minimum size of luma samples of a luma leaf block that is a result of quad tree split of CTU and a value obtained by taking a binary logarithm of a minimum coding block size for a luma coding unit in slices of slice type 0 (B slice), 1 (P slice), or 2 (I slice) referring to SPS. When the value of partition_constraints_override_enabled_flag is 1, the value of sps_log2_diff_min_qt_min_cb_inter_slice may be changed to the value of pic_log2_diff_min_qt_min_cb_luma that is present in a picture header referring to SPS. sps_log2_diff_min_qt_min_cb_inter_slice may have a value between 0 and (CtbLog2SizeY−MinCbLog2SizeY). The value (MinQtLog2SizeInterY) obtained by taking a binary logarithm of a minimum size of luma samples of a luma leaf block that is a result of quad tree split of CTU may be calculated as shown in in Equation 4.

$$MinQtLog2SizeInterY = sps\_log2\_diff\_min\_q\_min\_cb\_inter\_slice + MinCbLog2SizeY \quad \text{[Equation 4]}$$

sps_max_mtt_hierarchy_depth_inter_slice is a syntax element indicating a basic maximum hierarchy depth of a coding unit. Here, the coding unit may be a result of multi-type split of a quad tree leaf node in a slice of slice type 0 (B slice) or slice type 1 (P slice) referring to SPS. In other words, sps_max_mtt_hierarchy_depth_inter_slice may be a syntax element indicating a maximum number of times a coding unit is able to be split in multi-type form in an inter slice. When the value of partition_constraints_override_enabled_flag is 1, the value of sps_max_mtt_hierarchy_depth_inter_slice may be changed to the value of pic_max_mtt_hierarchy_depth_inter_slice that is present in a picture header referring to SPS. sps_max_mtt_hierarchy_depth_inter_slice may have a value between 0 and 2*(CtbLog2SizeY−MinCbLog2SizeY).

sps_max_mtt_hierarchy_depth_intra_slice_luma is a syntax element indicating a basic maximum hierarchy depth of a coding unit. Here, the coding unit may be a result of multi-type split of a quad tree leaf node in a slice of slice type 2 (I slice) referring to SPS. Namely, this may be a syntax element indicating a maximum number of times a coding unit is able to be further split in multi-type form in an intra slice. When the value of partition_constraints_override_enabled_flag is 1, the value of sps_max_mtt_hierarchy_depth_intra_slice_luma may be changed to the value of pic_max_mtt_hierarchy_depth_intra_slice_luma that is present in a picture header referring to SPS. sps_max_mtt_hierarchy_depth_intra_slice_luma may a value between 0 and 2*(CtbLog2SizeY−MinCbLog2SizeY).

sps_log2_diff_max_bt_min_qt_intra_slice_luma may be a syntax element indicating a difference between a value obtained by taking a binary logarithm of a maximum size (width or height) of a luma coding block capable of being binary split and a value obtained by taking a binary logarithm of a minimum size (width or height) of a luma leaf block that is a result of quad tree split of CTU in slices of slice type 2 (I slice) referring to SPS. When the value of partition_constraints_override_enabled_flag is 1, the value of sps_log2_diff_max_bt_min_qt_intra_slice_luma may be changed to the value of pic_log2_diff_max_bt_min_qt_luma that is present in a picture header referring to SPS. sps_log2_diff_max_bt_min_qt_intra_slice_luma may have a value between 0 and (CtbLog2SizeY−MinQtLog2SizeIntraY). When sps_log2_diff_max_bt_min_qt_intra_slice_luma is not present, the value of sps_log2_diff_max_bt_min_qt_intra_slice_luma may be inferred as 0.

sps_log2_diff_max_tt_min_qt_intra_slice_luma may be a syntax element indicating a difference between a value obtained by taking a binary logarithm of a maximum size (width or height) of a luma coding block capable of being ternary split and a value obtained by taking a binary logarithm of a minimum size (width or height) of a luma leaf node that is a result of quad tree split of CTU in slices of slice type 2 (I slice) referring to SPS. When the value of partition_constraints_override_enabled_flag is 1, the value of sps_log2_diff_max_tt_min_qt_intra_slice_luma may be changed to the value of pic_log2_diff_max_tt_min_qt_luma that is present in a picture header referring to SPS. sps_log2_diff_max_tt_min_qt_intra_slice_luma may have a value between 0 and (CtbLog2SizeY−MinQtLog2SizeIntraY). When sps_log2_diff_max_tt_min_qt_intra_slice_luma is not present, the value of sps_log2_diff_max_tt_min_qt_intra_slice_luma may be inferred as 0.

sps_log2_diff_max_bt_min_qt_inter_slice may be a syntax element indicating a difference between a value obtained by taking a binary logarithm of a maximum size (width or height) of a luma coding block capable of being binary split and a value obtained by taking a binary logarithm of a minimum size of a luma leaf block that is a result of quad tree split of CTU in slices of slice type 0 (B slice) or 1 (P slice) referring to SPS. When the value of partition_constraints_override_enabled_flag is 1, the value of sps_log2_diff_max_bt_min_qt_inter_slice may be changed to the value of pic_log2_diff_max_bt_min_qt_luma that is present in a picture header referring to SPS.

sps_log2_diff_max_bt_min_qt_inter_slice may have a value between 0 and (CtbLog2SizeY−MinQtLog2SizeInterY). When sps_log2_diff_max_bt_min_qt_inter_slice is not present, the value of sps_log2_diff_max_bt_min_qt_inter_slice may be inferred as 0.

sps_log2_diff_max_tt_min_qt_inter_slice may be a syntax element indicating a difference between a value obtained by taking a binary logarithm of a maximum size (width or height) of a luma coding block capable of being ternary split and a value obtained by taking a binary logarithm of a minimum size of a luma leaf block that is a result of quad tree split of CTU in slices of slice type 0 (B slice) or 1 (P slice) referring to SPS.

When the value of partition_constraints_override_enabled_flag is 1, the value of partition_constraints_override_enabled_flag may be changed to the value of pic_log2_diff_max_tt_min_qt_luma that is present in a picture header referring to SPS. sps_log2_diff_max_tt_min_qt_inter_slice may have a value between 0 and (CtbLog2SizeY−MinQtLog2SizeInterY). When sps_log2_diff_max_tt_min_qt_inter_slice is not present, the value of sps_log2_diff_max_tt_min_qt_inter_slice may be inferred as 0.

sps_log2_diff_min_qt_min_cb_intra_slice_chroma may be a syntax element indicating a difference between a value obtained by taking a binary logarithm of a minimum size of a chroma leaf block that is a result of quad tree split of a chroma CTU having a tree type of DUAL_TREE_CHROMA and a value obtained by taking a binary logarithm of a minimum coding block size of chroma CUs having a tree type of DUAL_TREE_CHROMA in a slice of slice type 2 (I slice) referring to SPS. When the value of partition_constraints_override_enabled_flag is 1, the value of sps_log2_diff_min_qt_min_cb_intra_slice_chroma may be changed to the value of pic_log2_diff_min_qt_min_cb_chroma that is present in a picture header referring to SPS.

sps_log2_diff_min_qt_min_cb_intra_slice_chroma may have a value between 0 and (CtbLog2SizeY MinCbLog2SizeY). When sps_log2_diff_min_qt_min_cb_intra_slice_chroma is not present, the value of sps_log2_diff_min_qt_min_cb_intra_slice_chroma may be inferred as 0. The value (MinQtLog2SizeIntraC) obtained by taking a binary logarithm of a minimum size of a chroma leaf block that is a result of quad tree split of a chroma CTU having a tree type of DUAL_TREE_CHROMA may be calculated as shown in in Equation 5.

$$MinQtLog2SizeIntraC = sps\_log2\_diff\_min\_qt\_min\_cbintra\_slice\_chroma + MinCbLog2SizeY \quad [\text{Equation 5}]$$

sps_max_mtt_hierarchy_depth_intra_slice_chroma may be a syntax element indicating a basic maximum hierarchy depth for a chroma coding unit that is a result of multi-type split of a chroma quad tree leaf node having a tree type of DUAL_TREE_CHROMA in a slice of slice type 2 (I slice) referring to SPS. When the value of partition_constraints_override_enabled_flag is 1, the value of sps_max_mtt_hierarchy_depth_intra_slice_chroma may be changed to the value of pic_max_mtt_hierarchy_depth_intra_slice_chroma that is present in a picture header referring to SPS. sps_max_mtt_hierarchy_depth_intra_slice_chroma may have a value between 0 and 2*(CtbLog2SizeY MinCbLog2SizeY). When sps_max_mtt_hierarchy_depth_intra_slice_chroma is not present, the value of sps_max_mtt_hierarchy_depth_intra_slice_chroma may be inferred as 0.

sps_log2_diff_max_bt_min_qt_intra_slice_chroma may be a syntax element indicating a difference between a value obtained by taking a binary logarithm of a maximum size (width or height) of a chroma coding block capable of being binary split and a value obtained by taking a binary logarithm of a minimum size (width or height) of a chroma leaf block that is a result of quad tree split of a chroma CTU having a tree type of DUAL_TREE_CHROMA in slices of slice type 2 (I slice) referring to SPS. When the value of partition_constraints_override_enabled_flag is 1, the value of sps_log2_diff_max_bt_min_qt_intra_slice_chroma may be changed to the value of pic_log2_diff_max_bt_min_qt_chroma that is present in a picture header referring to SPS. sps_log2_diff_max_bt_min_qt_intra_slice_chroma may have a value between 0 and (CtbLog2SizeY−MinQtLog2SizeIntraC). When sps_log2_diff_max_bt_min_qt_intra_slice_chroma is not present, the value of sps_log2_diff_max_bt_min_qt_intra_slice_chroma may be inferred as 0.

sps_log2_diff_max_tt_min_qt_intra_slice_chroma may be a syntax element indicating a difference between a value obtained by taking a binary logarithm of a maximum size (width or height) of a chroma coding block capable of being ternary split and a value obtained by taking a binary logarithm of a minimum size (width or height) of a chroma leaf block that is a result of quad tree split of a chroma CTU having a tree type of DUAL_TREE_CHROMA in slices of slice type 2 (I slice) referring to SPS. When the value of partition_constraints_override_enabled_flag is 1, the value of sps_log2_diff_max_tt_min_qt_intra_slice_chroma may be changed to the value of pic_log2_diff_max_tt_min_qt_chroma that is present in a picture header referring to SPS. sps_log2_diff_max_tt_min_qt_intra_slice_chroma may have a value between 0 and (CtbLog2SizeY−MinQtLog2SizeIntraC). When sps_log2_diff_max_tt_min_qt_intra_slice_chroma is not present, the value of sps_log2_diff_max_tt_min_qt_intra_slice_chroma may be inferred as 0.

The slice types described in the present disclosure may include three types. Slice type 0 may be B slice, slice type 1 may be P slice, and slice type 2 may be I slice. Slice types 0 and 1 may be encoded/decoded using inter prediction and intra prediction methods, and slice type 2 may be encoded/decoded using only intra prediction.

The tree types described in the present disclosure may include two types. These types may be roughly classified into a single tree (SINGLE_TREE) and a dual tree. Here, the dual tree may be classified according to whether a block is a luma (DUAL_TREE_LUMA) component or a chroma (DUAL_TREE_CHROMA) component. In the single tree, a block of a luma component and a block of a chroma component may be split using the same method when splitting a block. In the dual tree, a block of a luma component and a block of a chroma component may be split using different methods when splitting a block.

FIG. 20 is a diagram illustrating a sequence parameter set RBSP syntax structure according to an embodiment of the present invention.

In detail, FIG. 20 shows a structure in which syntax elements related to a coding block partition in the SPS RBSP syntax are signalled/parsed. MinCbSizeY and CtbSizeY among the above-mentioned variables may have the same value. log2_min_luma_coding_block_size_minus2 may have a value between 0 and (sps_log2_ctu_size_minus5+3). For example, a CTU may have a size of 32 when sps_log2_ctu_size_minus5 has a value of 0, and, here, log2_min_luma_coding_block_size_minus2 may have a value between 0 and 3. When the value of log2_min_luma_coding_block_size_minus2 is 3, MinCbLog2SizeY has a value of 5 and MinCbSizeY has a value of 32 according to Equation 2 (i.e., 1<<5). MinCbSizeY and CtbSizeY become equal. Even when the value of sps_log2_ctu_size_minus5 is 1, MinCbSizeY and CtbSizeY may become equal likewise. However, when the value of sps_log2_ctu_size_minus5 is 2, a case in which MinCbSizeY and CtbSizeY are equal may not occur. A portion of the partition-related syntax elements of FIG. 20 may indicate a value of 0 when MinCbSizeY and CtbSizeY are equal. Therefore, when MinCbSizeY and CtbSizeY are equal, the partition-related syntax elements may be inferred as having a value of 0 without being signalled/parsed. For example, among the syntax elements, sps_log2_diff_min_qt_min_cb_intra_slice_luma, sps_log2_diff_min_qt_min_cb_inter_slice, sps_max_mtt_hierarchy_depth_inter_slice, sps_max_mtt_hierarchy_depth_intra_slice_luma, sps_log2_diff_min_qt_min_cb_intra_slice_chroma, and sps_max_mtt_hierarchy_depth_intra_slice_chroma, which are syntax elements having a value between 0 and (CtbLog2SizeY−MinCbLog2SizeY), may be inferred as having a value of 0.

Syntax elements sps_log2_diff_max_bt_min_qt_intra_slice_luma, sps_log2_diff_max_tt_min_qt_intra_slice_luma, sps_log2_diff_max_bt_min_qt_inter_slice, and sps_log2_diff_max_tt_min_qt_inter_slice may have a value between 0 and (CtbLog2SizeY−MinQtLog2SizeIntraY). Since the value of sps_log2_diff_min_qt_min_cb_inter_slice is inferred as 0, MinQtLog2SizeIntraY is equal to MinCbLog2SizeY according to Equation 4. The value of CtbLog2SizeY may be 0 equal to the value of MinCbLog2SizeY.

Syntax elements sps_log2_diff_max_bt_min_qt_intra_slice_chroma and sps_log2_diff_max_tt_min_qt_intra_slice_chroma may have a value between 0 and (CtbLog2SizeY−MinQtLog2SizeIntraC). Since the value of sps_log2_diff_min_qt_min_cb_intra_slice_chroma is inferred as 0, MinQtLog2SizeIntraC is equal to MinCbLog2SizeY according to Equation 5. The value of CtbLog2SizeY may be 0 equal to the value of MinCbLog2SizeY.

Therefore, the syntax elements partition_constraints_override_enabled_flag, sps_log2_diff_min_qt_min_cb_intra_slice_luma, sps_log2_diff_min_qt_min_cb_inter_slice, sps_max_mtt_hierarchy_depth_inter_slice, and sps_max_mtt_hierarchy_depth_intra_slice_luma of FIG. 20 may be signalled/parsed only when the value of MinCbSizeY and the value of CtbSizeY are not equal. In other words, the above syntax elements may be signalled/parsed when the condition 'MinCbSizeY !=CtbSizeY' is true. Furthermore, when parameters (syntax elements) related to a coding block partition are present in a picture header referring to SPS, values of the parameters related to a coding block partition are prioritized over values defined in SPS. In other words, the values of the parameters related to a coding block partition are changed to values defined in a picture header. Furthermore, syntax elements sps_log2_diff_min_qt_min_cb_intra_slice_chroma and sps_max_mtt_hierarchy_depth_intra_slice_chroma which are signalled/parsed when qtbtt_dual_tree_intra_flag is true may be signalled/parsed only when the condition (MinCbSizeY !=CtbSizeY) is true additionally. qtbtt_dual_tree_intra_flag is a syntax element indicating that a coding block may be split for each tree type.

FIG. 21 is a diagram illustrating a picture header RBSP syntax structure according to an embodiment of the present invention.

In detail FIG. 21 shows parameter override-related syntax elements related to block partition included in the picture header RBSP syntax structure. Referring to FIG. 21, when partition_constraints_override_enabled_flag of the SPS RBSP syntax referred to by a picture header is true, a parameter (syntax element) corresponding to a block partition-related parameter (syntax element) defined in the SPS RBSP syntax is present in a picture header. Here, a value defined in a picture header may be preferentially used at the time of block partition. Partition-related parameters defined in a picture header may the same issue as mentioned above with reference to FIG. 20. However, referring to FIG. 20, the syntax element partition_constraints_override_enabled_flag is signalled/parsed when MinCbSizeY and CtbSizeY are not equal. Therefore, a new value may be defined in a picture header only when the value of partition_constraints_override_enabled_flag is true (i.e., 1), and the newly defined value may be preferentially used at the time of block partition.

FIG. 22 is a diagram illustrating a picture header RBSP syntax structure according to an embodiment of the present invention.

In detail, referring to FIG. 22, syntax elements included in the picture header RBSP syntax structure may be related to information necessary for determining a quantization parameter (qp) value of a coding unit.

When a value of cu_qp_delta_enabled_flag is 1, it indicates that syntax elements pic_cu_qp_delta_subdiv_intra_slice and pic_cu_qp_delta_subdiv_inter_slice may be present in picture headers referring to SPS. Furthermore, when the value of cu_qp_delta_enabled_flag is 1, it indicates that cu_qp_delta_abs may be present in a transform unit.

pic_cu_qp_delta_subdiv_intra_slice is a syntax element indicating a maximum cbSubdiv value of a coding unit in an intra slice conveying cu_qp_delta_abs and cu_qp_delta_sign_flag. pic_cu_qp_delta_subdiv_intra_slice may have a value between 0 and 2*(CtbLog2SizeY−MinQtLog2SizeIntraY+pic_max_mtt_hierarchy_depth_intra_slice_luma). When pic_cu_qp_delta_subdiv_intra_slice is not present, the value of pic_cu_qp_delta_subdiv_intra_slice may be inferred as 0.

pic_cu_qp_delta_subdiv_inter_slice is a syntax element indicating a maximum cbSubdiv value of a coding unit in an inter slice conveying cu_qp_delta_abs and cu_qp_delta_sign_flag. pic_cu_qp_delta_subdiv_inter_slice may have a value between 0 and 2*(CtbLog2SizeY−MinQtLog2SizeInterY+pic_max_mtt_hierarchy_depth_inter_slice). When pic_cu_qp_delta_subdiv_inter_slice is not present, the value of pic_cu_qp_delta_subdiv_inter_slice may be inferred as 0.

pic_cu_chroma_qp_offset_subdiv_intra_slice is a syntax element indicating a maximum cbSubdiv value of a coding unit in an intra slice conveying cu_chroma_qp_offset_flag. pic_cu_chroma_qp_offset_subdiv_intra_slice may have a value between 0 and 2*(CtbLog2SizeY−MinQtLog2SizeIntraY+pic_max_mtt_hierarchy_depth_intra_slice_luma). When pic_cu_chroma_qp_offset_subdiv_intra_slice is not present, the value of pic_cu_chroma_qp_offset_subdiv_intra_slice may be inferred as 0.

pic_cu_chroma_qp_offset_subdiv_inter_slice is a syntax element indicating a maximum cbSubdiv value of a coding unit in an inter slice conveying cu_chroma_qp_offset_flag. pic_cu_chroma_qp_offset_subdiv_inter_slice may have a value between 0 and 2*(CtbLog2SizeY−MinQtLog2SizeInterY+pic_max_mtt_hierarchy_depth_inter_slice). When pic_cu_chroma_qp_offset_subdiv_inter_slice is not present, the value of pic_cu_chroma_qp_offset_subdiv_inter_slice may be inferred as 0.

FIG. 23 is a diagram illustrating a picture header RBSP syntax structure according to an embodiment of the present invention.

In detail, FIG. 23 shows that a quantization parameter-related syntax element included in the picture header RBSP syntax structure is signalled/parsed. The quantization parameter-related syntax element pic_cu_qp_delta_subdiv_intra_slice described with reference to FIG. 22 may have a value between 0 and 2*(CtbLog2SizeY−MinQtLog2SizeIntraY+pic_max_mtt_hierarchy_depth_intra_slice_luma). Meanwhile, as described above with reference to FIG. 20, MinCbSizeY and CtbSizeY may have the same value. In this case, the value of pic_max_mtt_hierarchy_depth_intra_slice_luma is 0. In addition, MinQtLog2SizeIntraY has the same value as MinCbLog2SizeY and CtbLog2SizeY, and, here, the value is 0. Therefore, pic_cu_qp_delta_subdiv_intra_slice has only a value of 0. Another syntax element pic_cu_qp_delta_subdiv_inter_slice may have a value between 0 and 2*(CtbLog2SizeY−MinQtLog2SizeInterY+pic_max_mtt_hierarchy_depth_inter_slice). Also in this case, as described above with reference to FIG. 20, MinCbSizeY and CtbSizeY may have the same value. In this case, the value of pic_max_mtt_hierarchy_depth_inter_slice is 0. In addition, MinQtLog2SizeInterY has the same value as MinCbLog2SizeY and CtbLog2SizeY, and, here, the value is 0. Therefore, pic_cu_qp_delta_subdiv_inter_slice has only a value of 0. For the same reason, pic_cu_chroma_qp_offset_subdiv_intra_slice and pic_cu_chroma_qp_offset_subdiv_inter_slice may also have a value of 0. Therefore, since a quantization parameter-related syntax element has a value of 0 when MinCbSizeY and CtbSizeY have the same value, a quantization parameter-related syntax element present in a picture header may be signalled/parsed when MinCbSizeY and CtbSizeY have different values (i.e., CtbSizeY !=MinCbSizeY) in FIG. 23.

FIG. 24 is a diagram illustrating a sequence parameter set RBSP syntax structure according to an embodiment of the present invention.

When a value of sps_video_parameter_set_id is larger than 0, it may indicate vps_video_parameter_set_id of VPS referred to in SPS. When the value of sps_video_parameter_set_id is 0, SPS may not refer to VPS, and the value of vps_max_layers_minus1 may be inferred as 0. Here, CVS may include only one layer.

sps_seq_parameter_set_id is a syntax element, which provides an ID for SPS so as to be referred to by other syntax elements. Here, the ID for SPS may be used as information to be referred to in PPS.

subpics_present_flag is a syntax element indicating whether a parameter (syntax element) related to a sub-picture is present in the SPS RBSP syntax structure. When the value of subpics_present_flag is 1, it may indicate that a parameter related to a sub-picture is present in the SPS RBSP syntax structure. When the value of subpics_present_flag is 0, it may indicate that a parameter related to a sub-picture is not present in the SPS RB SP syntax structure. When the value of subpics_present_flag is 1, the sub-picture-related parameters described below may be signalled/parsed. subpics_present_flag described in the present disclosure is the same syntax element as subpic_info_present_flag of FIG. 24, and these elements are interchangeably used in the present disclosure. Here, among sub-picture-related parameters which are signalled/parsed, the same parameters as those of FIG. 11 will not be described.

subpic_id_mapping_explicity_signalled_flag is a syntax element indicating whether sub-picture ID mapping is explicitly signalled. Here, sub-picture ID mapping may be signalled in SPS or PPS referred to by a coded picture of a CLVS. When a value of subpic_id_mapping_explicity_signalled_flag is 1, it indicates that sub-picture ID mapping is explicitly signalled in a CLVS. When the value of subpic_id_mapping_explicity_signalled_flag is 0, it indicates that sub-picture ID mapping is not explicitly signalled in a CLVS. When subpic_id_mapping_explicity_signalled_flag is not present, the value of subpic_id_mapping_explicity_signalled_flag may be inferred as 0.

subpic_id_mapping_in_sps_flag is a syntax element indicating a signalling level of sub-picture ID mapping when the value of subpic_id_mapping_explicity_signalled_flag is 1. When a value of subpic_id_mapping_in_sps_flag is 1, it indicates that sub-picture ID mapping is signalled in SPS. When the value of subpic_id_mapping_in_sps_flag is 0, it indicates that sub-picture ID mapping is signalled in PPS.

FIG. 25 is a diagram illustrating a sequence parameter set RBSP syntax structure according to an embodiment of the present invention.

In detail, FIG. 25 shows the SPS RBSP syntax structure including a syntax element related to the number of sub-pictures. Referring to FIG. 25, syntax elements related to the number of sub-pictures may be signalled/parsed when the value of subpic_info_present_flag of FIG. 24 is 1, subpic_info_present_flag being a flag indicating presence of sub-picture information on the basis of basic information of syntax elements. A single picture may be split into a plurality of sub-pictures. Here, the number of split sub-pictures may have a value obtained by adding 1 to the value of sps_num_subpics_minus1. Here, a value indicating the number of sub-pictures may be between 0 and Ceil(pic_width_max_in_luma_samples÷CtbSizeY)

Ceil(pic_height_max_in_luma_samples±CtbSizeY)−1. When the value of sps_num_subpics_minus1 is 0, the number of sub-pictures is 1. Namely, the number of sub-pictures being 1 in a single picture has the same meaning as that the single picture is not split into sub-pictures. When the value of sps_num_subpics_minus1 is 0, pieces of information (syntax elements) considering various cases which may occur when a plurality of sub-pictures are present may be inferred without being signalled/parsed. The syntax structure illustrated in FIG. 25 indicates that when the value of sps_num_subpics_minus1 is 0, the value of sps_independent_subpics_flag, the value of sps_subpic_id_len_minus1, and the value of subpic_id_mapping_explicitly_signalled_flag may be inferred. Here, each of inferred values may be 0. Furthermore, each of inferred values may be inferred as an individual value for performing a preset operation. In other words, when the number of sub-pictures is at least 2 (i.e., sps_num_subpics_minus1>0), sps_independent_subpics_flag, sps_subpic_id_len_minus1, and subpic_id_mapping_explicitly_signalled_flag may be signalled/parsed. sps_ independent_subpics_flag is a syntax element indicating whether to treat boundaries of all sub-pictures like a boundary of a picture. Furthermore, sps_independent_subpics_flag may further indicate that loop filtering is not used in a sub-picture boundary. sps_subpic_id_len_minus1 is a syntax element indicating the number of bits required when mapping a sub-picture ID value. subpic_id_mapping_explicitly_signalled_flag is a syntax element indicating whether a sub-picture ID is explicitly signalled. When the value of sps_independent_subpics_flag is 1, a sub-picture boundary may be treated like a boundary of a picture. Furthermore, it indicates that loop filtering may not be used in a sub-picture boundary. When the value of sps_independent_subpics_flag is 0, it indicates that there is no constraint on whether to treat a sub-picture boundary like a boundary of a picture. Furthermore, it indicates that there is no constraint on whether to use loop filtering in a sub-picture boundary. When the value of subpic_id_mapping_explicitly_signalled_flag is 1, it indicates that a sub-picture ID may be explicitly signalled, and when the value of subpic_id_mapping_explicitly_signalled_flag is 0, it indicates that a sub-picture ID value is not explicitly signalled.

FIG. 26 is a diagram illustrating a picture parameter set RBSP syntax structure according to an embodiment of the present invention.

The syntax elements shown in FIG. 26 are described below. Here, among the syntax elements shown in FIG. 26, the same syntax elements as the syntax elements described with reference to FIG. 12 will not be described.

subpic_id_mapping_in_pps_flag is a syntax element indicating whether sub-picture ID mapping is signalled in PPS. When a value of subpic_id_mapping_in_pps_flag is 1, it may indicate that sub-picture ID mapping is signalled in PPS. When the value of subpic_id_mapping_in_pps_flag is 0, it indicates that sub-picture ID mapping is not signalled in PPS. When the value of subpic_id_mapping_explicitly_signalled_flag is 0 or the value of subpic_id_mapping_in_sps_flag is 1, the value of subpic_id_mapping_in_pps_flag is necessarily required to be 0. Otherwise (i.e., when the value of subpic_id_mapping_explicitly_signalled_flag is 1 and the value of subpic_id_mapping_in_sps_flag is 0), the value of subpic_id_mapping_in_pps_flag is required to be 1.

When the value of subpic_id_mapping_in_pps_flag is 1, syntax elements pps_num_subpics_minus1, pps_subpic_id_len_minus, and pps_subpic_id[i] related to sub-picture ID mapping may be signalled/parsed.

FIG. 27 is a diagram illustrating subpic_id_mapping_in_pps_flag included in the picture parameter set RBSP syntax structure.

In detail, FIG. 27 shows a method for setting the value of subpic_id_mapping_in_pps_flag described with reference to FIG. 26. It has been described with reference to FIG. 25 that when the value of sps_num_subpics_minus1 is 0, syntax elements for various cases which may occur when a plurality of sub-pictures are present may be inferred without being signalled/parsed. Likewise, the sub-picture-related syntax elements described with reference to FIG. 26 may be similarly signalled/parsed on the basis of the value of subpic_id_mapping_in_pps_flag in PPS referring to SPS. Therefore, when the value of sps_num_subpics_minus1 described with reference to FIG. 25 is 0, the value of subpic_id_mapping_in_pps_flag may be set to 0 so that sub-picture-related syntax elements may be inferred without being signalled/parsed. Here, referring to FIG. 27, the condition for setting the value of subpic_id_mapping_in_pps_flag to 0 may additionally include a case where the value of sps_num_subpics_minus1 is 0.

FIG. 28 is a diagram illustrating a picture parameter set RBSP syntax structure according to an embodiment of the present invention.

In detail, FIG. 28 shows a structure in which a flag indicating whether a loop filter is applied across tiles is signalled/parsed. One picture may be split into a plurality of sub-pictures, and one picture/sub-picture may be split into a plurality of tiles. Furthermore, one picture/sub-picture may be split into a plurality of slices, and one tile may also be split into a plurality of slices. Here, a width and height of a tile may be a multiple of CTB in units of CTB.

no_pic_partition_flag is a syntax element indicating whether an individual picture is subject to further split. When a value of no_pic_partition_flag is 1, it indicates that an individual picture referring to PPS is not subject to further split. When the value of no_pic_partition_flag is 0, it indicates that an individual picture referring to PPS may be split into more than one tile or slice.

num_exp_tile_columns_minus1 is a syntax element indicating a value related to a tile column width. num_exp_tile_columns_minus1 indicates a value obtained by subtracting 1 from a tile column width. In other words, a value obtained by adding 1 to the value of num_exp_tile_columns_ minus1 indicates a value of tile column widths. num_exp_tile_columns_minus1 may have a value between 0 and PicWidthInCtbsY−1. When the value of no_pic_partition_flag is 1, the value of num_exp_tile_columns_minus1 may be inferred as 0.

num_exp_tile_row_minus1 is a syntax element indicating a value related to a tile row height. num_exp_tile_row_minus1 indicates a value obtained by subtracting 1 from a tile row height. In other words, a value obtained by adding 1 to the value of num_exp_tile_row_minus1 indicates a value of tile row heights. num_exp_tile_rows_minus1 may have a value between 0 and PicHeightInCtbsY−1. When the value of no_pic_partition_flag is 1, the value of num_tile_rows_ minus1 may be inferred as 0.

There may be a case where the value of num_exp_tile_columns_minus1 and the value of num_exp_tile_row_minus1 are both 0. Here, a variable NumTilesInPic may be determined by Equation 6.

$$NumTilesInPic=NumTileColumns*NumTileRows \quad \text{[Equation 6]}$$

NumTilesInPic denotes the number of tiles in a picture, NumTileColumns denotes the number of tile rows in a picture, and NumTileRows denotes the number of tile columns in a picture.

The variables NumTileColumns and NumTileRows may be induced while determining colWidth[ ].

When the value of loop_filter_across_tiles_enabled_flag of FIG. 28 is 1, it indicates that an in-loop filtering operation may be performed across tiles present in a picture. When a value of loop_filter_across_tiles_enabled_flag is 0, it indicates that an in-loop filtering operation is not performed across tiles present in a picture. The in-loop filtering operation may include deblocking filter, sample adaptive offset filter, and adaptive loop filter operations. When loop_filter_across_tiles_enabled_flag is not present, the value of loop_filter_across_tiles_enabled_flag may be inferred as 1.

When one picture, sub-picture, or slice is configured with one tile, it is not necessary to indicate whether a loop filter is applied across tiles. Therefore, the value of no_pic_partition_flag may be inferred as a preset value, wherein the preset value may be 1.

FIG. 29 is a diagram illustrating a network abstract layer (NAL) unit that is a basic unit constituting a bitstream.

When a video image is encoded and stored as a bitstream via the encoder, the bitstream may be configured in units of network abstraction layer. A network abstraction layer unit is referred to as an NAL unit below. An NAL unit may be defined in various forms according to a purpose thereof and may be distinguished by unique ID. An NAL unit may be divided into a part including actual image data information and a part including information required for decoding such a video image. FIG. 29 is a diagram illustrating a portion of various types of NAL units. An NAL unit may be configured on the basis of a predefined order, and pieces of information included in the corresponding NAL unit may also be configured on the basis of a preset order. Each NAL unit may have a cross reference relationship. As shown in FIG. 29, an NAL unit DPS indicates a decoding parameter set (DPS) RBSP syntax. An NAL unit VPS indicates a video parameter set (VPS) RBSP syntax. An NAL unit SPS indicates a sequence parameter set (SPS) RB SP syntax. An NAL unit PPS indicates a picture parameter set (PPS) RBSP syntax. The DPS RBSP syntax is a syntax including information (syntax element) required for the decoder to perform video decoding. The DPS RBSP syntax may be described as a decoding capability information (DCI) RBSP syntax. The VPS RBSP syntax is a syntax including information (syntax element) commonly used to decode basic layer and enhanced layer encoded data. The SPS RBSP syntax is a syntax including syntax elements transmitted in a sequence unit level. The SPS RBSP syntax may include information (syntax element) commonly used to decode a picture by referring to VPS. Here, the sequence represents a set of one or more pictures. The PPS RBSP syntax is a syntax including information (syntax element) commonly used to decode at least one picture. The above-mentioned RBSP, which is a raw byte sequence payload (RBSP), may represent a syntax which is byte aligned and encapsulated as an NAL unit. The above-mentioned syntaxes are described below.

FIGS. 30A to 30C are a diagram illustrating a decoding parameter set RB SP syntax structure, a sequence parameter set RBSP syntax structure, and a profile tier level syntax structure according to an embodiment of the present invention.

FIG. 30A is a diagram illustrating a decoding parameter set (DPS) RBSP syntax, FIG. 30B is a diagram illustrating a sequence parameter set (SPS) RBSP syntax, and FIG. 30C is a diagram illustrating a profile tier level syntax 'profile_tier_level( )'.

As shown in FIGS. 30A and 30B, the profile tier level syntax may be included (called) in the DPS RBSP syntax and the SPS RBSP syntax. The profile tier level syntax may include information related to a profile, tier, and level. Here, the profile tier level syntax may include a syntax 'general_constraint_info( )' for general constraint information (GCI). The syntax for GCI (hereinafter referred to as GCI syntax) may control to disable a tool and/or function, etc. included in the GCI syntax and/or another syntax (e.g., DPS RBSP syntax, VPS RBSP syntax, SPS RBSP syntax, PPS RBSP syntax, Sliceheader syntax, or the like) for interoperability. When the GCI syntax indicates to disable a tool and/or function, tools and/or functions declared in a lower syntax may be disabled. Here, according to a position of an NAL unit parsed by the decoder, it may be determined whether to apply the tool and/or function disabled by the GCI syntax to all bitstreams or partial bitstreams. For example, the profile level syntax 'profile_tier_level( )' may be included in the DPS RBSP syntax and/or the SPS RBSP syntax, and when the profile tier level syntax is included in the DPS RBSP syntax, the GCI syntax included in the profile tier level syntax may be applied to all bitstreams. For another example, when the profile tier level syntax is included in the SPS RBSP syntax, the GCI syntax included in the profile tier level syntax may be applied in a coded layer video sequence (CLVS).

FIGS. 31A and 31B are a diagram illustrating a video parameter set RBSP syntax and a general constraint information syntax according to an embodiment of the present invention.

FIG. 31A is a diagram illustrating a video parameter set (VPS) RBSP syntax according to an embodiment of the present invention, and FIG. 31B is a diagram illustrating a general constraint information (GCI) syntax according to an embodiment of the present invention. As shown in FIG. 31(a), the GCI syntax 'general_constraint_info( )' may be included in the VPS syntax. Furthermore, although not illustrated in FIG. 31A, the above-mentioned profile tier level syntax may be included in the VPS syntax, and the GCI syntax may be included in the profile tier level syntax included in the VPS syntax. The GCI syntax may include at least one syntax element. FIGS. 32 and 33 are diagrams illustrating a sequence parameter set (SPS) RBSP syntax according to an embodiment of the present invention. Hereinafter, a constraint flag that is a syntax element included in the GCI syntax will be described with reference to FIGS. 31A to 33.

no_qtbtt_dual_tree_intra_constraint_flag no_qtbtt_dual_tree_intra_constraint_flag is a flag for controlling qtbtt_dual_tree_intra_flag. For example, when a value of no_qtbtt_dual_tree_intra_constraint_flag is 1, a value of qtbtt_dual_tree_intra_flag may be set to 0. Meanwhile, when the value of no_qtbtt_dual_tree_intra_constraint_flag is 0, there is no constraint on the value of qtbtt_dual_tree_intra_flag. That is, the value of qtbtt_dual_tree_intra_flag may be determined according to a parsing result of the SPS RBSP syntax.

Here, qtbtt_dual_tree_intra_flag is a flag indicating whether I slice is used in a coding_tree syntax structure. For example, when the value of qtbtt_dual_tree_intra_flag is 1, it indicates that for I slice, each coding tree unit (CTU) may be split into coding units having 64×64 luma samples through implicit quad tree split, wherein the coding units are root nodes (highest coding unit) of the separate coding_tree syntax structure for two elements, i.e., luma and chroma. When the value of qtbtt_dual_tree_intra_flag is 0, it may indicate that the coding_tree syntax structure is not used for I slice. The above-mentioned qtbtt_dual_tree_intra_flag may be referred to as sps_qtbtt_dual_tree_intra_flag.

Referring to FIG. 32, log2_ctu_size_minus5 is a syntax element indicating size information of a luma coding tree block of each coding tree unit. The size (CtbLog2SizeY) of a luma coding tree block in units of log2 may be found by adding 5 to log2_ctu_size_minus5. This is expressed as Equation 7 as below. In Equation 7, CtbSizeY denotes a size of each luma coding tree block.

$$CtbLog2SizeY = log2\_ctu\_size\_minus5 + 5$$

$$CtbSizeY = 1 << CtbLog2SizeY \quad \text{[Equation 7]}$$

no_partition_constraints_override_constraint_flag no_partition_constraints_override_constraint_flag is a flag for controlling partition_constraints_override_enabled_flag. For example, when a value of no_partition_constraints_override_constraint_flag is 1, a value of partition_constraints_override_enabled_flag may be set to 0. Meanwhile, when the value of no_partition_constraints_override_constraint_flag is 0, there is no constraint on the value of partition_constraints_override_enabled_flag. That is, the value of partition_constraints_override_enabled_flag may be determined according to a parsing result of the SPS RBSP syntax.

Here, partition_constraints_override_enabled_flag is a flag indicating whether ph_partition_constraints_override_flag is present in a picture header (PH). When a value of partition_constraints_override_enabled_flag is 1, it indicates that ph_partition_constraints_override_flag is present, and when the value of partition_constraints_override_enabled_flag is 0, it indicates that ph_partition_constraints_override_flag is not present. The above-mentioned partition_constraints_override_enabled_flag may be referred to as sps_partition_constraints_override_enabled_flag.

no_sao_constraint_flag no_sao_constraint_flag is a flag for controlling sps_sao_enabled_flag. For example, when a value of no_sao_constraint_flag is 1, a value of sps_sao_enabled_flag may be set to 0. Meanwhile, when the value of no_sao_constraint_flag is 0, there is no constraint on the value of sps_sao_enabled_flag. That is, the value of sps_sao_enabled_flag may be determined according to a parsing result of the SPS RBSP syntax.

Here, sps_sao_enabled_flag is a flag indicating whether a sample adaptive offset process is applied to a reconstructed picture after a deblocking filter process for a coded layer video sequence (CLVS). For example, when the value of sps_sao_enabled_flag is 1, it indicates that the sample adaptive offset process is enabled for a reconstructed picture after the deblocking filter process for a CLVS, and the sample adaptive offset process is applied to a reconstructed picture after the deblocking filter process for a CLVS. When the value of sps_sao_enabled_flag is 0, it indicates that the sample adaptive offset process is disabled for a reconstructed picture after the deblocking filter process for a CLVS, and the sample adaptive offset process is not applied to a reconstructed picture after the deblocking filter process for a CLVS.

no_alf_constraint_flag no_alf_constraint_flag is a flag for controlling sps_alf_enabled_flag. For example, when a value of no_alf_constraint_flag is 1, a value of sps_alf_enabled_flag may be set to 0. Meanwhile, when the value of no_alf_constraint_flag is 0, there is no constraint on the value of sps_alf_enabled_flag. That is, the value of sps_alf_enabled_flag may be determined according to a parsing result of the SPS RBSP syntax.

Here, sps_alf_enabled_flag is a flag indicating whether an adaptive loop filter which is applied in decoding of pictures in a CLVS is enabled. For example, when the value of sps_alf_enabled_flag is 1, the adaptive loop filter is enabled and may be applied in decoding of pictures in a CLVS. When the value of sps_alf_enabled_flag is 0, it indicates that the adaptive loop filter is disabled and is not applied in decoding of pictures in a CLVS.

no_joint_cbcr_constraint_flag no_joint_cbcr_constraint_flag is a flag for controlling sps_joint_cbcr_enabled_flag. For example, when a value of no_joint_cbcr_constraint_flag is 1, a value of sps_joint_cbcr_enabled_flag may be set to 0. Meanwhile, when the value of no_joint_cbcr_constraint_flag is 0, there is no constraint on the value of sps_joint_cbcr_enabled_flag. That is, the value of sps_joint_cbcr_enabled_flag may be determined according to a parsing result of the SPS RBSP syntax.

Here, sps_joint_cbcr_enabled_flag is a flag indicating whether joint coding of chroma residuals used in decoding of pictures in a CLVS is enabled. For example, when the value of sps_joint_cbcr_enabled_flag is 1, it indicates that the joint coding of chroma residuals is enabled and may be used in decoding of pictures in a CLVS. When the value of sps_joint_cbcr_enabled_flag is 0, it indicates that the joint coding of chroma residuals is disabled and is not used in decoding of pictures in a CLVS. Meanwhile, sps_joint_cbcr_enabled_flag may not be present, and, in this case, the value of sps_joint_cbcr_enabled_flag may be inferred as 0.

no_ref_wraparound_constraint_flag no_ref_wraparound_constraint_flag is a flag for controlling sps_ref_wraparound_enabled_flag. For example, when a value of no_ref_wraparound_constraint_flag is 1, a value of sps_ref_wraparound_enabled_flag may be set to 0. Meanwhile, when the value of no_ref_wraparound_constraint_flag is 0, there is no constraint on the value of sps_ref_wraparound_enabled_flag. That is, the value of sps_ref_wraparound_enabled_flag may be determined according to a parsing result of the SPS RBSP syntax.

Here, sps_ref_wraparound_enabled_flag is a flag indicating whether horizontal wrap-around motion compensation which is applied in decoding of pictures in a CLVS is enabled. For example, when the value of sps_ref_wraparound_enabled_flag is 1, it indicates that the horizontal wrap-around motion compensation is enabled and may be applied in decoding of pictures in a CLVS. When the value of sps_ref_wraparound_enabled_flag is 0, it indicates that the horizontal wrap-around motion compensation is disabled and is not applied in decoding of pictures in a CLVS.

no_temporal_mvp_constraint_flag no_temporal_mvp_constraint_flag is a flag for controlling sps_temporal_mvp_enabled_flag. For example, when a value of no_temporal_mvp_constraint_flag is 1, a value of sps_temporal_mvp_enabled_flag may be set to 0. Meanwhile, when the value of no_temporal_mvp_constraint_flag is 0, there is no constraint on the value of sps_temporal_mvp_enabled_flag. That is, the value of sps_temporal_mvp_enabled_flag may be determined according to a parsing result of the SPS RBSP syntax.

Here, sps_temporal_mvp_enabled_flag is a flag indicating whether temporal motion vector predictors used in decoding of pictures in a CLVS are enabled. For example, when the value of sps_temporal_mvp_enabled_flag is 1, it indicates that the temporal motion vector predictors are enabled and may be used in decoding of pictures in a CLVS. When the value of sps_temporal_mvp_enabled_flag is 0, it indicates that the temporal motion vector predictors are disabled and are not used in decoding of pictures in a CLVS.

no_sbtmvp_constraint_flag no_sbtmvp_constraint_flag is a flag for controlling sps_sbtmvp_enabled_flag. For example, when a value of no_sbtmvp_constraint_flag is 1, a value of sps_sbtmvp_enabled_flag may be set to 0. Meanwhile, when the value of no_sbtmvp_constraint_flag is 0, there is no constraint on the value of sps_sbtmvp_enabled_flag. That is, the value of sps_sbtmvp_enabled_flag may be determined according to a parsing result of the SPS RBSP syntax.

Here, sps_sbtmvp_enabled_flag is a flag indicating whether subblock-based temporal motion vector predictors used in decoding of pictures in a CLVS are enabled. For example, when the value of sps_sbtmvp_enabled_flag is 1, it indicates that the subblock-based temporal motion vector predictors are enabled and may be used in decoding of pictures in a CLVS. Here, a slice type of pictures may include types (e.g., B slice, P slice) except for I slice. When the value of sps_sbtmvp_enabled_flag is 0, it indicates that the subblock-based temporal motion vector predictors are disabled and are not used in decoding of pictures in a CLVS.

no_amvr_constraint_flag no_amvr_constraint_flag is a flag for controlling sps_amvr_enabled_flag. For example, when a value of no_amvr_constraint_flag is 1, a value of sps_amvr_enabled_flag may be set to 0. Meanwhile, when the value of no_amvr_ constraint_flag is 0, there is no constraint on the value of sps_amvr_enabled_flag. That is, the value of sps_amvr_enabled_flag may be determined according to a parsing result of the SPS RBSP syntax.

Here, sps_amvr_enabled_flag is a flag indicating whether motion vector difference resolution used in decoding of pictures in a CLVS is enabled. For example, when the value of sps_amvr_enabled_flag is 1, it indicates that the motion vector difference resolution is enabled and may be used in decoding of pictures in a CLVS. When the value of sps_amvr_enabled_flag is 0, it indicates that the motion vector difference resolution is disabled and is not used in decoding of pictures in a CLVS.

no_bdof_constraint_flag no_bdof_constraint_flag is a flag for controlling sps_bdof_enabled_flag. For example, when a value of no_bdof_constraint_flag is 1, a value of sps_bdof_enabled_flag may be set to 0. Meanwhile, when the value of no_bdof_constraint_flag is 0, there is no constraint on the value of sps_bdof_enabled_flag. That is, the value of sps_bdof_enabled_flag may be determined according to a parsing result of the SPS RBSP syntax.

Here, sps_bdof_enabled_flag is a flag indicating whether bi-directional optical flow inter prediction used in decoding of pictures in a CLVS is enabled. For example, when the value of sps_bdof_enabled_flag is 1, it indicates that the bi-directional optical flow inter prediction is enabled and may be used in decoding of pictures in a CLVS. When the value of sps_bdof_enabled_flag is 0, it indicates that the bi-directional optical flow inter prediction is disabled and is not used in decoding of pictures in a CLVS.

no_dmvr_constraint_flag no_dmvr_constraint_flag is a flag for controlling sps_dmvr_enabled_flag. For example, when a value of no_dmvr_constraint_flag is 1, a value of sps_dmvr_enabled_ flag may be set to 0. Meanwhile, when the value of no_dmvr_constraint_flag is 0, there is no constraint on the value of sps_dmvr_enabled_flag. That is, the value of sps_dmvr_enabled_flag may be determined according to a parsing result of the SPS RBSP syntax.

Here, sps_dmvr_enabled_flag is a flag indicating whether decoder motion vector refinement-based bi-prediction used in decoding of pictures in a CLVS is enabled. For example, when the value of sps_dmvr_enabled_flag is 1, it indicates that the decoder motion vector refinement-based bi-prediction is enabled and may be used in decoding of pictures in a CLVS. When the value of sps_dmvr_enabled_flag is 0, it indicates that the decoder motion vector refinement-based bi-prediction is disabled and is not used in decoding of pictures in a CLVS.

no_cclm_constraint_flag no_cclm_constraint_flag is a flag for controlling sps_cclm_enabled_flag. For example, when a value of no_cclm_constraint_flag is 1, a value of sps_cclm_enabled_flag may be set to 0. Meanwhile, when the value of no_cclm_constraint_flag is 0, there is no constraint on the value of sps_cclm_enabled_flag. That is, the value of sps_cclm_enabled_flag may be determined according to a parsing result of the SPS RBSP syntax.

Here, sps_cclm_enabled_flag is a flag indicating whether cross-component linear model intra prediction from a luma component to a chroma component used in decoding of pictures in a CLVS is enabled. For example, when the value of sps_cclm_enabled_flag is 1, it indicates that the cross-component linear model intra prediction from a luma component to a chroma component is enabled and may be used in decoding of pictures in a CLVS. When the value of sps_cclm_enabled_flag is 0, it indicates that the cross-component linear model intra prediction from a luma component to a chroma component is disabled and is not used in decoding of pictures in a CLVS. Meanwhile, sps_cclm_enabled_flag may not be present, and, in this case, the value of sps_cclm_enabled_flag may be inferred as 0.

no_mts_constraint_flag no_mts_constraint_flag is a flag for controlling sps_mts_enabled_flag. For example, when a value of no_mts_constraint_flag is 1, a value of sps_mts_enabled_flag may be set to 0. Meanwhile, when the value of no_mts_constraint_flag is 0, there is no constraint on the value of sps_mts_enabled_flag. That is, the value of sps_mts_enabled_flag may be determined according to a parsing result of the SPS RBSP syntax.

Here, sps_mts_enabled_flag is a flag indicating whether sps_explicit_mts_intra_enabled_flag and sps_explicit_mts_inter_enabled_flag are present in a sequence parameter set (SPS). For example, when the value of sps_mts_enabled_flag is 1, it indicates that sps_explicit_mts_intra_enabled_flag and sps_explicit_mts_inter_enabled_flag are present in SPS. When the value of sps_mts_enabled_flag is 0, it indicates that sps_explicit_mts_intra_enabled_flag and sps_explicit_mts_inter_enabled_flag are not present in SPS.

Here, sps_explicit_mts_intra_enabled_flag and sps_explicit_mts_inter_enabled_flag are flags indicating whether mts_idx is present in an intra coding unit syntax of a CLVS. For example, when a value of sps_explicit_mts_intra_enabled_flag/sps_explicit_mts_inter_enabled_flag is 1, it indicates that mts_idx may be present in an intra/inter coding unit syntax. When the value of sps_explicit_mts_intra_enabled_flag/sps_explicit_mts_inter_enabled_flag is 0, it indicates that mts_idx is not present in the intra/inter coding unit syntax. Meanwhile, sps_explicit_mts_intra_enabled_flag/sps_explicit_mts_inter_enabled_flag may not be present, and, in this case, the value of sps_explicit_mts_intra_enabled_flag/sps_explicit_mts_inter_enabled_flag may be inferred as 0.

The above-mentioned mts_idx is a syntax element indicating a transform kernel applied along horizontal and vertical directions of a luma transform block associated in a current coding unit.

no_sbt_constraint_flag no_sbt_constraint_flag is a flag for controlling sps_sbt_enabled_flag. For example, when a value of no_sbt_constraint_flag is 1, a value of sps_sbt_enabled_flag may be set to 0. Meanwhile, when the value of no_sbt_constraint_flag is 0, there is no constraint on the value of sps_sbt_enabled_flag. That is, the value of sps_sbt_enabled_flag may be determined according to a parsing result of the SPS RBSP syntax.

Here, sps_sbt_enabled_flag is a flag indicating whether subblock transform for inter-predicted coding units (CUs) used in decoding of pictures in a CLVS is enabled. For example, when the value of sps_sbt_enabled_flag is 1, it indicates that the subblock transform for inter-predicted coding units is enabled and may be used in decoding of pictures in a CLVS. When the value of sps_sbt_enabled_flag is 0, it indicates that the subblock transform for inter-predicted coding units is disabled and is not used in decoding of pictures in a CLVS.

no_affine_motion_constraint_flag no_affine_motion_constraint_flag is a flag for controlling sps_affine_enabled_flag. For example, when a value of no_affine_motion_constraint_flag is 1, a value of sps_affine_enabled_flag may be set to 0. Meanwhile, when the value of no_affine_motion_constraint_flag is 0, there is no constraint on the value of sps_affine_enabled_flag. That is, the value of sps_affine_enabled_flag may be determined according to a parsing result of the SPS RB SP syntax.

Here, sps_affine_enabled_flag is a flag indicating whether affine model-based motion compensation used in decoding of pictures in a CLVS is enabled. Furthermore, sps_affine_enabled_flag indicates whether inter affine flag and cu affine type flag are present in a coding unit syntax of a CLVS. For example, when the value of sps_affine_enabled_flag is 1, it indicates that the affine model-based motion compensation is enabled and may be used in decoding of pictures in a CLVS. Furthermore, when the value of sps_affine_enabled_flag is 1, it indicates that inter affine flag and cu affine type flag may be present in the coding unit syntax of a CLVS. When the value of sps_affine_enabled_flag is 0, it indicates that the affine model-based motion compensation is disabled and is not used in decoding of pictures in a CLVS. When the value of sps_affine_enabled_flag is 0, it indicates that inter affine flag and cu affine type flag are not present in the coding unit syntax of a CLVS.

Here, inter affine flag is a flag indicating whether the affine model-based motion compensation is used to generate a prediction sample of a current coding unit when decoding the current coding unit. cu affine type flag is a flag indicating whether the affine model-based motion compensation that uses 4 parameters is used or the affine model-based motion compensation that uses 6 parameters is used when decoding a current coding unit.

no_bcw_constraint_flag no_bcw_constraint_flag is a flag for controlling sps_bcw_enabled_flag. For example, when a value of no_bcw_constraint_flag is 1, a value of sps_bcw_enabled_flag may be set to 0. Meanwhile, when the value of no_bcw_constraint_flag is 0, there is no constraint on the value of sps_bcw_enabled_flag. That is, the value of sps_bcw_enabled_flag may be determined according to a parsing result of the SPS RBSP syntax.

Here, sps_bcw_enabled_flag is a flag indicating whether bi-directional prediction using coding unit weights, which is used in decoding of pictures in a CLVS, is enabled. Furthermore, sps_bcw_enabled_flag may also indicate whether bcw_idx is present in the coding unit syntax of a CLVS. For example, when the value of sps_bcw_enabled_flag is 1, it indicates that the bi-directional prediction using coding unit weights is enabled and may be used in decoding of pictures in a CLVS. Furthermore, when the value of sps_bcw_enabled_flag is 1, it indicates that bcw_idx may be present in the coding unit syntax of a CLVS. When the value of sps_bcw_enabled_flag is 0, it indicates that the bi-directional prediction using coding unit weights is disabled and is not used in decoding of pictures in a CLVS. Furthermore, when the value of sps_bcw_enabled_flag is 0, it indicates that bcw_idx is not present in the coding unit syntax of a CLVS.

Here, bcw_idx is a syntax element indicating an index related to bi-directional prediction using coding unit weights.

no_ibc_constraint_flag no_ibc_constraint_flag is a flag for controlling sps_ibc_enabled_flag. For example, when a value of no_ibc_constraint_flag is 1, a value of sps_ibc_enabled_flag may be set to 0. Meanwhile, when the value of no_ibc_constraint_flag is 0, there is no constraint on the value of sps_ibc_enabled_flag. That is, the value of sps_ibc_enabled_flag may be determined according to a parsing result of the SPS RBSP syntax.

Here, sps_ibc_enabled_flag is a flag indicating whether an intra block copy (IBC) prediction mode used in decoding of pictures in a CLVS is enabled. For example, when the value of sps_ibc_enabled_flag is 1, it indicates that the IBC prediction mode is enabled and may be used in decoding of pictures in a CLVS. When the value of sps_ibc_enabled_flag is 0, it indicates that the IBC prediction mode is disabled and is not used in decoding of pictures in a CLVS.

no_ciip_constraint_flag no_ciip_constraint_flag is a flag for controlling sps_ciip_enabled_flag. For example, when a value of no_ciip_constraint_flag is 1, a value of sps_ciip_enabled_flag may be set to 0. Meanwhile, when the value of no_ciip_constraint_flag is 0, there is no constraint on the value of sps_ciip_enabled_flag. That is, the value of sps_ciip_enabled_flag may be determined according to a parsing result of the SPS RBSP syntax.

Here, sps_ciip_enabled_flag is a flag indicating whether ciip_flag is present in a coding unit syntax for inter coding units. For example, when a value of sps_ciip_enabled_flag is 0, it indicates that ciip_flag is not present in the coding unit syntax for inter coding units. When the value of sps_ciip_enabled_flag is 1, it indicates that ciip_flag may be present in the coding unit syntax for inter coding units.

ciip_flag is a flag indicating whether inter-picture merge and intra-picture prediction are applied to a current coding unit.

no_fpel_mmvd_constraint_flag no_fpel_mmvd_constraint_flag is a flag for controlling sps_fpel_mmvd_enabled_flag. For example, when a value of no_fpel_mmvd_constraint_flag is 1, a value of sps_fpel_mmvd_enabled_flag may be set to 0. Meanwhile, when the value of no_fpel_mmvd_constraint_flag is 0, there is no constraint on the value of sps_fpel_mmvd_enabled_flag. That is, the value of sps_fpel_mmvd_enabled_flag may be determined according to a parsing result of the SPS RB SP syntax.

Here, sps_fpel_mmvd_enabled_flag is a flag indicating the type of sample precision used in a merge mode using a motion vector difference. For example, when the value of sps_fpel_mmvd_enabled_flag is 1, it indicates that the sample precision used in the merge mode using a motion vector difference is integer sample precision. When the value of sps_fpel_mmvd_enabled_flag is 0, it indicates that the sample precision used in the merge mode using a motion vector difference is fractional sample precision. Meanwhile, sps_fpel_mmvd_enabled_flag may not be present, and, in this case, the value of sps_fpel_mmvd_enabled_flag may be inferred as 0. sps_fpel_mmvd_enabled_flag may be referred to as sps_mmvd_fullpel_only_flag.

no_triangle_constraint_flag no_triangle_constraint_flag is a flag for controlling sps_triangle_enabled_flag. For example, when a value of no_triangle_constraint_flag is 1, a value of sps_triangle_enabled_flag may be set to 0. Meanwhile, when the value of no_triangle_constraint_flag is 0, there is no constraint on the value of sps_triangle_enabled_flag. That is, the value of sps_triangle_enabled_flag may be determined according to a parsing result of the SPS RBSP syntax.

Here, sps_triangle_enabled_flag is a flag indicating whether triangle-based motion compensation is able to be applied. According to a triangle-based motion compensation prediction method, an inter coding unit may be split into two triangle shapes with respect to a diagonal line on the inter coding unit, and each triangle area may have a different motion information set, and, by performing motion compensation based on this, a prediction sample may be generated.

no_ladf_constraint_flag no_ladf_constraint_flag is a flag for controlling sps_ladf_enabled_flag. For example, when a value of no_ladf_constraint_flag is 1, a value of sps_ladf_enabled_flag may be set to 0. Meanwhile, when the value of no_ladf_constraint_flag is 0, there is no constraint on the value of sps_ladf_enabled_flag. That is, the value of sps_ladf_enabled_flag may be determined according to a parsing result of the SPS RBSP syntax.

Here, sps_ladf_enabled_flag is a flag indicating whether sps_num_ladf_intervals_minus2, sps_ladf_lowest_interval_qp_offset, sps_ladf_qp_offset[i], and sps_ladf_delta_threshold_minus1[i] are present in SPS. For example, when the value of sps_ladf_enabled_flag is 1, it indicates that sps_num_ladf_intervals_minus2, sps_ladf_lowest_interval_qp_offset, sps_ladf_qp_offset[i], and sps_ladf_delta_threshold_minus1[i] are present in SPS. When the value of sps_ladf_enabled_flag is 0, it indicates that sps_num_ladf_intervals_minus2, sps_ladf_lowest_interval_qp_offset, sps_ladf_qp_offset[i], and sps_ladf_delta_threshold_minus1[i] are not present in SPS.

sps_num_ladf_intervals_minus2 is a syntax element indicating the number of sps_ladf_delta_threshold_minus1[i] and sps_ladf_qp_offset[i] present in SPS. sps_num_ladf_intervals_minus2 may have a value between 0 and 3.

sps_ladf_lowest_interval_qp_offset is a syntax element indicating an offset used to derive a quantization parameter (QP) that is a variable. sps_ladf_lowest_interval_qp_offset may have a value between −63 and 63.

sps_ladf_qp_offset[i] is a syntax element indicating an offset array used to derive a quantization parameter that is a variable. sps_ladf_qp_offset[i] may have a value between −63 and 63.

sps_ladf_delta_threshold_minus1[i] is a syntax element used to calculate a value of SpsLadfIntervalLowerBound[i] which is a syntax element specifying a lower limit of an i-th luma intensity level interval. sps_ladf_delta_threshold_minus1[i] may have a value between 0 and 2BitDepth−3. BitDepth, which indicates a bit depth, represents the number of bits required for expressing brightness of an image.

no_transform_skip_constraint_flag no_transform_skip_constraint_flag is a flag for controlling sps_transform_skip_enabled_flag. For example, when a value of no_transform_skip_constraint_flag is 1, a value of sps_transform_skip_enabled_flag may be set to 0. Meanwhile, when the value of no_transform_skip_constraint_flag is 0, there is no constraint on the value of sps_transform_skip_enabled_flag. That is, the value of sps_transform_skip_enabled_flag may be determined according to a parsing result of the SPS RB SP syntax.

Here, sps_transform_skip_enabled_flag is a flag indicating whether transform skip flag is present in a transform unit syntax. For example, when the value of sps_transform_skip_enabled_flag is 1, it indicates that transform skip flag may be present in the transform unit syntax. When the value of sps_transform_skip_enabled_flag is 0, it indicates that transform skip flag is not present in the transform unit syntax.

transform skip flag is a flag indicating whether transform has been applied to a transform unit.

no_bdpcm_constraint_flag no_bdpcm_constraint_flag is a flag for controlling sps_bdpcm_enabled_flag. For example, when a value of no_bdpcm_constraint_flag is 1, a value of sps_bdpcm_enabled_flag may be set to 0. Meanwhile, when the value of no_bdpcm_constraint_flag is 0, there is no constraint on the value of sps_bdpcm_enabled_flag. That is, the value of sps_bdpcm_enabled_flag may be determined according to a parsing result of the SPS RBSP syntax.

Here, sps_bdpcm_enabled_flag is a flag indicating whether intra_bdpcm_luma_flag and intra_bdpcm_chroma_flag are present in a coding unit syntax for intra coding units. For example, when a value of sps_bdpcm_enabled_flag is 1, it indicates that intra_bdpcm_luma_flag and intra_bdpcm_chroma_flag may be present in the coding unit syntax for intra coding units. When the value of sps_bdpcm_enabled_flag is 0, it indicates that intra_bdpcm_luma_flag and intra_bdpcm_chroma_flag are not present in the coding unit syntax for intra coding units. Meanwhile, sps_bdpcm_enabled_flag may not be present, and, in this case, the value of sps_bdpcm_enabled_flag may be inferred as 0.

intra_bdpcm_luma_flag/intra_bdpcm_chroma_flag are flags indicating whether block-based delta pulse code modulation (bdpcm) is applied to a luma/chroma coding block of a particular position (x0, y0).

no_qp_delta_constraint_flag no_qp_delta_constraint_flag is a flag for controlling cu_qp_delta_enabled_flag. For example, when a value of no_qp_delta_constraint_flag is 1, a value of cu_qp_delta_enabled_flag may be set to 0. Meanwhile, when the value of no_qp_delta_constraint_flag is 0, there is no constraint on the value of cu_qp_delta_enabled_flag. That is, the value of cu_qp_delta_enabled_flag may be determined according to a parsing result of the SPS RBSP syntax.

Here, cu_qp_delta_enabled_flag is a flag indicating whether syntax elements ph_cu_qp_delta_subdiv_intra_slice and ph_cu_qp_delta_subdiv_inter_slice are present in PHs referring to PPS. Furthermore, cu_qp_delta_enabled_ flag indicates whether cu_qp_delta_abs and cu_qp_delta_sign_flag which are syntax elements included in a transform unit syntax and a palette coding syntax are present. For example, when the value of cu_qp_delta_enabled_flag is 1, it indicates that syntax elements ph_cu_qp_delta_subdiv_intra_slice and ph_cu_qp_delta_subdiv_inter_slice may be present in PHs referring to PPS. Furthermore, when the value of cu_qp_delta_enabled_flag is 1, it indicates that syntax elements cu_qp_delta_abs and cu_qp_delta_sign_flag may be present in the transform unit syntax and the palette coding syntax. When the value of cu_qp_delta_enabled_flag is 0, it indicates that syntax elements ph_cu_qp_delta_subdiv_intra_slice and ph_cu_qp_delta_subdiv_inter_slice are not present in PHs referring to PPS. Furthermore, when the value of cu_qp_delta_enabled_flag is 0, it indicates that syntax elements cu_qp_delta_abs and cu_qp_delta_sign_flag are not present in the transform unit syntax and the palette coding syntax.

ph_cu_qp_delta_subdiv_intra_slice/ph_cu_qp_delta_subdiv_inter_slice are syntax elements indicating a maximum value 'cbSubdiv' of a coding unit in an intra/inter slice conveying cu_qp_delta_abs and cu_qp_delta_sign_flag. Here, 'cbSubdiv' indicates a lower split value of a block.

cu_qp_delta_abs is a syntax element indicating an absolute value of a difference 'CTuQpDeltaVal' between a quantization parameter of a current coding unit and a quantization parameter prediction value of the current coding unit.

cu_qp_delta_sign_flag is a flag indicating a sign of the 'CuQpDeltaVal'.

no_dep_quant_constraint_flag no_dep_quant_constraint_flag is a flag for controlling sps_dep_quant_enabled_flag. For example, when a value of no_dep_quant_constraint_flag is 1, a value of sps_dep_quant_enabled_flag may be set to 0. Meanwhile, when the value of no_dep_quant_constraint_flag is 0, there is no constraint on the value of sps_dep_quant_enabled_flag. That is, the value of sps_dep_quant_enabled_flag may be determined according to a parsing result of the SPS RBSP syntax.

Here, sps_dep_quant_enabled_flag is a flag indicating whether dependent quantization used in pictures referring to SPS is enabled. For example, when the value of sps_dep_quant_enabled_flag is 1, it indicates that the dependent quantization is enabled and may be used in pictures referring to SPS. When the value of sps_dep_quant_enabled_flag is 0, it indicates that the dependent quantization is disabled and is not used in pictures referring to SPS.

no_sign_data_hiding_constraint_flag no_sign_data_hiding_constraint_flag is a flag for controlling sps_sign_data_hiding_enabled_flag. For example, when a value of no_sign_data_hiding_constraint_flag is 1, a value of sps_sign_data_hiding_enabled_flag may be set to 0. Meanwhile, when the value of no_sign_data_hiding_constraint_flag is 0, there is no constraint on the value of sps_sign_data_hiding_enabled_flag. That is, the value of sps_sign_data_hiding_enabled_flag may be determined according to a parsing result of the SPS RBSP syntax.

Here, sps_sign_data_hiding_enabled_flag is a flag indicating whether sign bit hiding used in pictures referring to SPS is enabled. For example, when the value of sps_sign_data_hiding_enabled_flag is 1, it indicates that the sign bit hiding used in pictures referring to SPS is enabled and may be used in pictures referring to SPS. When the value of sps_sign_data_hiding_enabled_flag is 0, it indicates that the sign bit hiding used in pictures referring to SPS is disabled and is not used in pictures referring to SPS.

FIG. 34 is a diagram illustrating a sequence parameter set (SPS) RBSP syntax according to an embodiment of the present invention.

Referring to FIG. 34, the SPS RBSP syntax element includes sps_scaling_list_enabled_flag so as to include an extended space for adding parameter information related to high dynamic range (hdr) and the sps parameters described below. The "if" clause below hrd_parameters_present_flag shown in FIG. 34 may be parameter information related to hdr.

FIG. 35 is a diagram illustrating a sequence parameter set RBSP syntax structure according to an embodiment of the present invention.

Syntax elements included in the SPS RBSP syntax structure will be described with reference to FIG. 35.

When a value of sps_entropy_coding_sync_enabled_flag is 1, a specific synchronization process may be applied to content variables. The specific synchronization process is applied before decoding a first CTU including a first CTB of a CTB row present in an individual tile in an individual picture referring to SPS. Furthermore, when the value of sps_entropy_coding_sync_enabled_flag is 1, a specific storage process may be applied to content variables. The specific storage process is applied after decoding a CTU including a first CTB of a CTB row present in an individual tile in an individual picture referring to SPS. When the value of sps_entropy_coding_sync_enabled_flag is 0, the specific synchronization process and the specific storage process may not be applied to content variables. Determining that the specific synchronization process is not applied is performed before decoding a first CTU including a first CTB of a CTB row present in an individual tile in an individual picture referring to SPS. Determining that the specific storage process is not applied is performed after decoding a CTU including a first CTB of a CTB row present in an individual tile in an individual picture referring to SPS.

same_qp_table_for_chroma is a syntax element related to a chroma QP mapping table. When a value of same_qp_table_for_chroma is 1, it indicates that only one chroma QP mapping table is used, wherein one chroma QP mapping table is also used in Cb, Cr residual signals and joint Cb-Cr residual signal. When the value of same_qp_table_for_chroma is 0, two chroma QP mapping tables for Cb and Cr and one chroma QP mapping table for joint Cb-Cr are signalled in SPS. The chroma QP mapping table may be signalled when the value of sps_joint_cbcr_enabled_flag is 1. When the value of same_qp_table_for_chroma is not present, the value of same_qp_table_for_chroma may be inferred as 1.

sps_explicit_mts_intra_enabled_flag is a syntax element indicating whether mtx_idx is present in an intra CU syntax. When a value of sps_explicit_mts_intra_enabled_flag is 1, it indicates that mtx_idx may be present in the intra CU syntax. When the value of sps_explicit_mts_intra_enabled_flag is 0, it indicates that mtx_idx is not present in the intra CU syntax. When sps_explicit_mts_intra_enabled_flag is not present, the value of sps_explicit_mts_intra_enabled_flag may be inferred as 0.

sps_explicit_mts_inter_enabled_flag is a syntax element indicating whether mtx_idx is present in an inter CU syntax. When a value of sps_explicit_mts_inter_enabled_flag is 1, it indicates that mtx_idx may be present in the inter CU syntax. When the value of sps_explicit_mts_inter_enabled_flag is 0, it indicates that mtx_idx is not present in the inter CU syntax. When sps_explicit_mts_inter_enabled_flag is not present, the value of sps_explicit_mts_inter_enabled_flag may be inferred as 0.

sps_affine_amvr_enabled_flag is a syntax element indicating whether adaptive motion vector difference resolution is used for a motion vector of an affine inter mode. When a value of sps_affine_amvr_enabled_flag is 1, it indicates that the adaptive motion vector difference resolution is used for a motion vector of an affine inter mode. When the value of sps_affine_amvr_enabled_flag is 0, it indicates that the adaptive motion vector difference resolution is not used for a motion vector of an affine inter mode. When sps_affine_amvr_enabled_flag is not present, the value of sps_affine_amvr_enabled_flag may be inferred as 0.

sps_affine_prof_enabled_flag is a syntax element indicating whether prediction refinement of an optical flow is used in affine motion compensation. When a value of sps_affine_prof_enabled_flag is 1, the affine motion compensation may be refined with the optical flow. When the value of sps_affine_prof_enabled_flag is 0, the affine motion compensation is not refined. When sps_affine_prof_enabled_flag is not present, the value of sps_affine_prof_enabled_flag may be inferred as 0.

sps_explicit_scaling_list_enabled_flag is a syntax element indicating whether an explicit scaling list is used. When a value of sps_explicit_scaling_list_enabled_flag is 1, it may indicate that the explicit scaling list is used. The explicit scaling list may be signalled in a scaling list of an adaptation parameter set (APS). Here, the explicit scaling list may be used in a scaling process for a transform coefficient when slice decoding is enabled for a CLVS. When the value of sps_explicit_scaling_list_enabled_flag is 0, it may indicate that the explicit scaling list is used in the scaling process for a transform coefficient when slice decoding is not enabled for a CLVS.

sps_virtual_boundaries_enabled_flag is a syntax element indicating whether in-loop filtering is disabled. When a value of sps_virtual_boundaries_enabled_flag is 1, it indicates that disabling of in-loop filtering at a virtual boundary may be applied to coded pictures in a CLVS. When the value of sps_virtual_boundaries_enabled_flag is 0, it indicates that the disabling of in-loop filtering at a virtual boundary is not applied to coded pictures in a CLVS. A loop filtering operation may include deblocking filter, sample adaptive offset filter, and adaptive loop filter operations.

FIG. 36 is a diagram illustrating a general constraint information syntax structure according to an embodiment of the present invention.

The syntax elements included in the general constraint information (GCI) syntax structure described with reference to FIG. 36 may enable/disable flags (syntax elements) defined in the SPS RBSP syntax. Here, the flags may be those shown in FIG. 35. The syntax elements included in the GCI syntax structure, described below, have a mutually exclusive relationship and are not limited by the names shown in FIG. 36. Furthermore, overlapping descriptions of portions, which are the same as or correspond to the embodiment of FIG. 35, of the flags (syntax elements) included in the SPS syntax structure restricted by the syntax elements included in the GCI syntax structure will not be provided.

no_weighted_pred_constraint_flag is a flag constraining sps_weighted_pred_flag included in the SPS syntax structure. When a value of no_weighted_pred_constraint_flag is 1, a value of sps_weighted_pred_flag is limited to 0. When the value of no_weighted_pred_constraint_flag is 0, the value of sps_weighted_pred_flag is not limited. sps_weighted_pred_flag is a syntax element indicating whether weighted prediction is applied to P slice referring to SPS. The weighted prediction is applied to P slice when a value of sps_weighted_pred_flag is 1, and the weighted prediction is not applied to P slice when the value of sps_weighted_pred_flag is 0.

no_weighted_bipred_constraint_flag is a flag constraining sps_weighted_bipred_flag included in the SPS syntax structure. When a value of no_weighted_bipred_constraint_flag is 1, a value of sps_weighted_bipred_flag is limited to 0. When the value of no_weighted_bipred_constraint_flag is 0, the value of sps_weighted_bipred_flag is not limited. sps_weighted_bipred_flag is a syntax element indicating whether weighted prediction is applied to B slice referring to SPS. The weighted prediction is applied to B slice when a value of sps_weighted_bipred_flag is 1, and the weighted prediction is not applied to B slice when the value of sps_weighted_bipred_flag is 0.

no same_qp_table_for_chroma constraint flag is a flag constraining same_qp_table_for_chroma included in the SPS syntax structure. When a value of no same_qp_table_for_chroma constraint flag is 1, a value of same_qp_table_for_chroma is limited to 0. When the value of no same_qp_table_for_chroma constraint flag is 0, the value of same_qp_table_for_chroma is not limited.

no_explicit_mts_intra_constraint_flag is a flag constraining sps_explicit_mts_intra_enabled_flag included in the SPS syntax structure. When a value of no_explicit_mts_intra_constraint_flag is 1, a value of sps_explicit_mts_intra_ enabled_flag is limited to 0. When the value of no_explicit_mts_intra_constraint_flag is 0, the value of sps_explicit_mts_intra_enabled_flag is not limited.

no_explicit_mts_inter_constraint_flag is a flag constraining sps_explicit_mts_inter_enabled_flag included in the SPS syntax structure. When a value of no_explicit_mts_inter_constraint_flag is 1, a value of sps_explicit_mts_inter_enabled_flag is limited to 0. When the value of no_explicit_mts_inter_constraint_flag is 0, the value of sps_explicit_mts_inter_enabled_flag is not limited.

no_affine_amvr_constraint_flag is a flag constraining sps_affine_amvr_enabled_flag included in the SPS syntax structure. When a value of no_affine_amvr_constraint_flag is 1, a value of sps_affine_amvr_enabled_flag is limited to 0. When the value of no_affine_amvr_constraint_flag is 0, the value of sps_affine_amvr_enabled_flag is not limited.

no_affine_prof_constraint_flag is a flag constraining sps_affine_prof_enabled_flag included in the SPS syntax structure. When a value of no_affine_prof_constraint_flag is 1, a value of sps_affine_prof_enabled_flag is limited to 0. When the value of no_affine_prof_constraint_flag is 0, the value of sps_affine_prof_enabled_flag is not limited.

no explicit scaling list constraint flag is a flag constraining sps_explicit_scaling_list_enabled_flag included in the SPS syntax structure. When a value of no explicit scaling list constraint flag is 1, a value of sps_explicit_scaling_list_enabled_flag is limited to 0. When the value of no explicit scaling list constraint flag is 0, the value of sps_explicit_scaling_list_enabled_flag is not limited.

no virtual boundaries constraint flag is a flag constraining sps_virtual_boundaries_enabled_flag included in the SPS syntax structure. When a value of no_virtual_boundaries_constraint_flag is 1, a value of sps_virtual_boundaries_enabled_flag is limited to 0. When the value of no_virtual_boundaries_constraint_flag is 0, the value of sps_virtual_boundaries_enabled_flag is not limited.

Although the present disclosure is established mainly with regard to a decoder, an encoder may perform the same operation. The term "parsing" included in the present disclosure has been mainly used in relation to a process of obtaining information from a bitstream, but may be interpreted as configuring corresponding information in a bitstream on an encoder side. Thus, the term "parsing" may also be interpreted as an act of configuring a bitstream in an encoder without being limited to operation of a decoder. Furthermore, such a bitstream may be stored in a computer-readable recording medium.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including instructions executable by a computer, such as a program module executed by a computer. A computer-readable medium may be any available medium that is accessible by a computer, and includes both volatile and nonvolatile media, removable and non-removable media. Further, the computer-readable medium may include both computer storage media and communication media. The computer storage medium includes both volatile and nonvolatile, removable and non-removable media implemented in any method or technology for storage of information such as computer readable instructions, data structures, program modules or other data. The communication media typically include computer readable instructions, data structures, other data in a modulated data signal such as program modules, or other transmission mechanisms, and include any information delivery media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising:
a processor,
wherein the processor is configured to:
decode a sequence parameter set (SPS) raw byte sequence payload (RBSP) syntax included in a bitstream of a video signal, and
decode the bitstream based on a decoding result of the SPS RBSP syntax,
wherein the SPS RBSP syntax
includes a first syntax element indicating whether information related to at least one sub-picture included in each picture is present,
includes a second syntax element indicating whether sub-picture ID mapping for the at least one sub-picture is signalled, and
includes a third syntax element indicating whether the sub-picture ID mapping for the at least one sub-picture is signalled on the SPS RBSP syntax,
wherein the second syntax element is parsed when the first syntax element indicates that the information related to the at least one sub-picture is present,
wherein the third syntax element is parsed when the second syntax element indicates that the sub-picture ID mapping for the at least one sub-picture is signalled, and
wherein when the third syntax element indicates that the sub-picture ID mapping for the at least one sub-picture is signalled on the SPS RBSP syntax, a sub-picture ID mapping value related the at least one sub-picture is signalled on the SPS RBSP syntax.

2. The video signal decoding device of claim 1, wherein a picture parameter set (PPS) RBSP syntax referring to the SPS RBSP syntax includes a fourth syntax element indicating whether the sub-picture ID mapping for the at least one sub-picture is signalled on the PPS RBSP syntax, wherein when the second syntax element indicating whether the sub-picture ID mapping for the at least one sub-picture is signalled and the third syntax element indicates that the sub-picture ID mapping value related the at least one sub-picture is not signalled on the SPS RBSP syntax, the fourth syntax element indicates that the sub-picture ID mapping for the at least one sub-picture is signalled on the PPS RBSP syntax, wherein the sub-picture ID mapping value related the at least one sub-picture is signalled on the PPS RB SP syntax.

3. The video signal decoding device of claim 1, wherein the SPS RBSP syntax includes a fifth syntax element related to a number of the at least one sub-picture, and includes a sixth syntax element indicating whether a boundary of the at least one sub-picture is processed like a boundary of a picture based on the fifth syntax element, wherein the sixth syntax element is parsed when the number of the at least one sub-picture is at least 2.

4. The video signal decoding device of claim 3, wherein the fifth syntax element indicates a value obtained by subtracting 1 from the number of the at least one sub-picture.

5. The video signal decoding device of claim 3, wherein the sixth syntax element further indicates whether loop filtering is applied to the boundary of the at least one sub-picture.

6. The video signal decoding device of claim 4, wherein the value indicated by the fifth syntax element is larger than 0.

7. The video signal decoding device of claim 3, wherein when the number of the at least one sub-picture is 1, the sixth syntax element is inferred as a preset value indicating whether loop filtering is applied to the boundary of the at least one sub-picture.

8. A video signal encoding device comprising:
a processor,
wherein the processor is configured to:
obtain a sequence parameter set (SPS) raw byte sequence payload (RBSP) syntax, and
encode a bitstream including the SPS RB SP syntax,
wherein the SPS RBSP syntax
includes a first syntax element indicating whether information related to at least one sub-picture included in each picture is present,
includes a second syntax element indicating whether sub-picture ID mapping for the at least one sub-picture is signalled, and
includes a third syntax element indicating whether the sub-picture ID mapping for the at least one sub-picture is signalled on the SPS RBSP syntax,
wherein the second syntax element is parsed when the first syntax element indicates that the information related to the at least one sub-picture is present,
wherein the third syntax element is parsed when the second syntax element indicates that the sub-picture ID mapping for the at least one sub-picture is signalled, and wherein when the third syntax element indicates that the sub-picture ID mapping for the at least one sub-picture is signalled on the SPS RBSP syntax, a sub-picture ID mapping value related the at least one sub-picture is signalled on the SPS RBSP syntax.

9. The video signal encoding device of claim 8, wherein a picture parameter set (PPS) RBSP syntax referring to the SPS RBSP syntax includes a fourth syntax element indicating whether the sub-picture ID mapping for the at least one sub-picture is signalled on the PPS RB SP syntax, wherein when the second syntax element indicating whether the sub-picture ID mapping for the at least one sub-picture is signalled and the third syntax element indicates that the sub-picture ID mapping value related the at least one sub-picture is not signalled on the SPS RBSP syntax, the fourth syntax element indicates that the sub-picture ID mapping for the at least one sub-picture is signalled on the PPS RB SP syntax, wherein the sub-picture ID mapping value related the at least one sub-picture is signalled on the PPS RB SP syntax.

10. The video signal encoding device of claim 8, wherein the SPS RBSP syntax includes a fifth syntax element related to a number of the at least one sub-picture, and includes a sixth syntax element indicating whether a boundary of the at least one sub-picture is processed like a boundary of a picture based on the fifth syntax element, wherein the sixth syntax element is parsed when the number of the at least one sub-picture is at least 2.

11. The video signal encoding device of claim 10, wherein the fifth syntax element indicates a value obtained by subtracting 1 from the number of the at least one sub-picture.

12. The video signal encoding device of claim 10, wherein the sixth syntax element further indicates whether loop filtering is applied to the boundary of the at least one sub-picture.

13. The video signal encoding device of claim 11, wherein the value indicated by the fifth syntax element is larger than 0.

14. The video signal encoding device of claim 10, wherein when the number of the at least one sub-picture is 1, the sixth syntax element is inferred as a preset value indicating whether loop filtering is applied to the boundary of the at least one sub-picture.

15. A non-transitory computer-readable medium storing a bitstream of a video signal,
wherein the bitstream is encoded through an encoding method comprising:
obtaining a sequence parameter set (SPS) raw byte sequence payload (RBSP) syntax; and
encoding a bitstream including the SPS RB SP syntax,
wherein the SPS RBSP syntax
includes a first syntax element indicating whether information related to at least one sub-picture included in each picture is present,
includes a second syntax element indicating whether sub-picture ID mapping for the at least one sub-picture is signalled, and
includes a third syntax element indicating whether the sub-picture ID mapping for the at least one sub-picture is signalled on the SPS RBSP syntax,
wherein the second syntax element is parsed when the first syntax element indicates that the information related to the at least one sub-picture is present, wherein the third syntax element is parsed when the second syntax element indicates that the sub-picture ID mapping for the at least one sub-picture is signalled, and wherein when the third syntax element indicates that the sub-picture ID mapping for the at least one sub-picture is signalled on the SPS RBSP syntax, a sub-picture ID mapping value related the at least one sub-picture is signalled on the SPS RBSP syntax.

16. The non-transitory computer-readable medium storing the bitstream, 15, wherein a picture parameter set (PPS) RBSP syntax referring to the SPS RBSP syntax includes a fourth syntax element indicating whether the sub-picture ID mapping for the at least one sub-picture is signalled on the PPS RB SP syntax, wherein when the second syntax element indicating whether the sub-picture ID mapping for the at least one sub-picture is signalled and the third syntax element indicates that the sub-picture ID mapping value related the at least one sub-picture is not signalled on the SPS RBSP syntax, the fourth syntax elements indicates that the sub-picture ID mapping for the at least one sub-picture is signalled on the PPS RB SP syntax, wherein the sub-picture ID mapping value related the at least one sub-picture is signalled on the PPS RB SP syntax.

17. The non-transitory computer-readable medium storing the bitstream, 15, wherein the SPS RBSP syntax includes a fifth syntax element related to a number of the at least one sub-picture, and includes a sixth syntax element indicating whether a boundary of the at least one sub-picture is processed like a boundary of a picture based on the fifth syntax element, wherein the sixth syntax element is parsed when the number of the at least one sub-picture is at least 2.

18. The non-transitory computer-readable medium storing the bitstream, 17, wherein the fifth syntax element indicates a value obtained by subtracting 1 from the number of the at least one sub-picture.

19. The non-transitory computer-readable medium storing the bitstream, 17, wherein the sixth syntax element further indicates whether loop filtering is applied to the boundary of the at least one sub-picture.

20. The non-transitory computer-readable medium storing the bitstream, 18, wherein the value indicated by the fifth syntax element is larger than 0.

21. A video signal decoding method comprising:

decoding a sequence parameter set (SPS) raw byte sequence payload (RBSP) syntax included in a bitstream of a video signal, and decoding the bitstream based on a decoding result of the SPS RBSP syntax, wherein the SPS RBSP syntax includes a first syntax element indicating whether information related to at least one sub-picture included in each picture is present, includes a second syntax element indicating whether sub-picture ID mapping for the at least one sub-picture is signalled, and includes a third syntax element indicating whether the sub-picture ID mapping for the at least one sub-picture is signalled on the SPS RBSP syntax, wherein the second syntax element is parsed when the first syntax element indicates that the information related to the at least one sub-picture is present, wherein the third syntax element is parsed when the second syntax element indicates that the sub-picture ID mapping for the at least one sub-picture is signalled, and wherein when the third syntax element indicates that the sub-picture ID mapping for the at least one sub-picture is signalled on the SPS RBSP syntax, a sub-picture ID mapping value related the at least one sub-picture is signalled on the SPS RBSP syntax.

* * * * *

UNITED STATES PATENT AND TRADEMARK OFFICE
CERTIFICATE OF CORRECTION

PATENT NO. : 11,575,943 B2
APPLICATION NO. : 17/844330
DATED : February 7, 2023
INVENTOR(S) : Dongcheol Kim et al.

It is certified that error appears in the above-identified patent and that said Letters Patent is hereby corrected as shown below:

In the Claims

Claim 16:
16. The non-transitory computer-readable medium storing the bitstream, 15, ...
Should read:
16. The non-transitory computer-readable medium storing the bitstream of a video signal of claim 15,...

Claim 17:
17. The non-transitory computer-readable medium storing the bitstream, 15,...
Should read:
17. The non-transitory computer-readable medium storing the bitstream of a video signal of claim 15,...

Claim 18:
18. The non-transitory computer-readable medium storing the bitstream, 17, ...
Should read:
18. The non-transitory computer-readable medium storing the bitstream of a video signal of claim 17, ...

Claim 19:
19. The non-transitory computer-readable medium storing the bitstream, 17,...
Should read:
19. The non-transitory computer-readable medium storing the bitstream of a video signal of claim 17,...

Signed and Sealed this
Tenth Day of December, 2024

Katherine Kelly Vidal
*Director of the United States Patent and Trademark Office*

CERTIFICATE OF CORRECTION (continued)
U.S. Pat. No. 11,575,943 B2

Claim 20:
20. The non-transitory computer-readable medium storing the bitstream, 18,...
Should read:
20. The non-transitory computer-readable medium storing the bitstream of a video signal of claim 18,...